Figure 58:
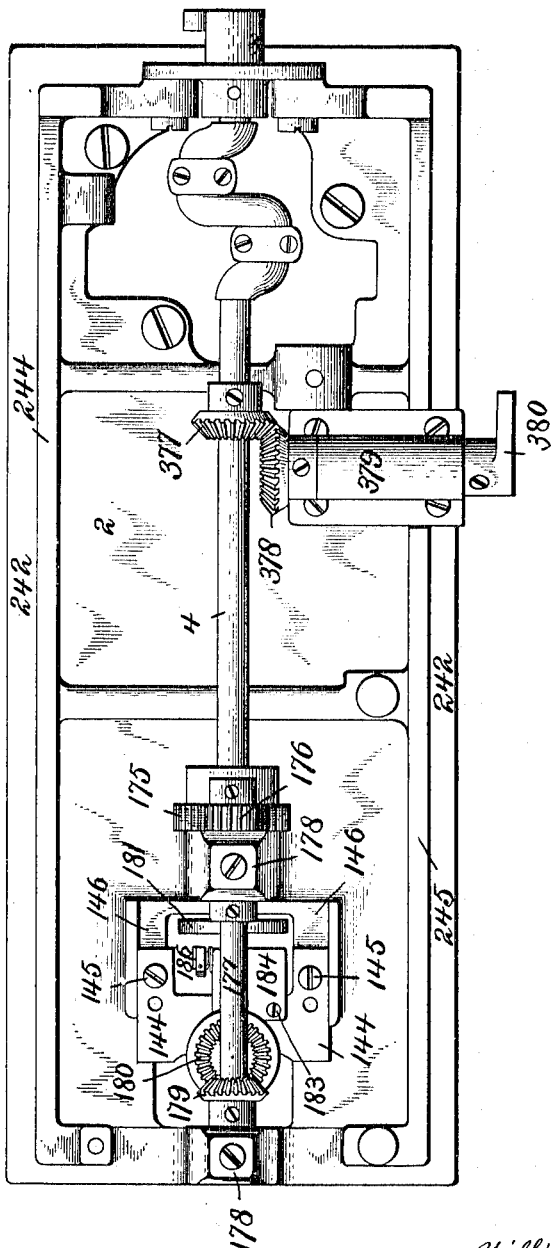

W. N. PARKES.
AUTOMATIC EMBROIDERY OR ORNAMENTAL STITCH SEWING MACHINE.
APPLICATION FILED NOV. 20, 1905.
1,119,449.
Patented Dec. 1, 1914.
19 SHEETS—SHEET 1.
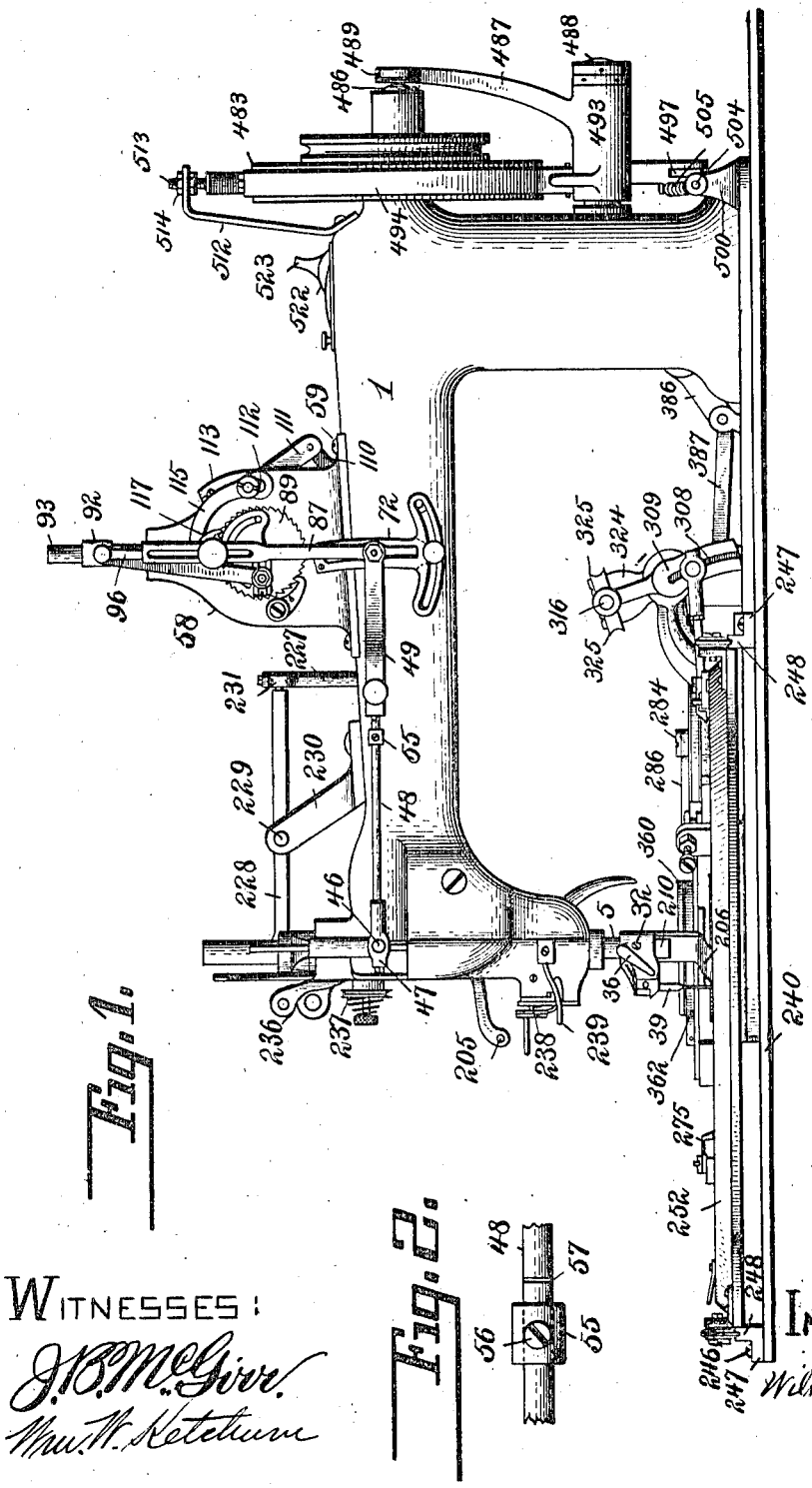

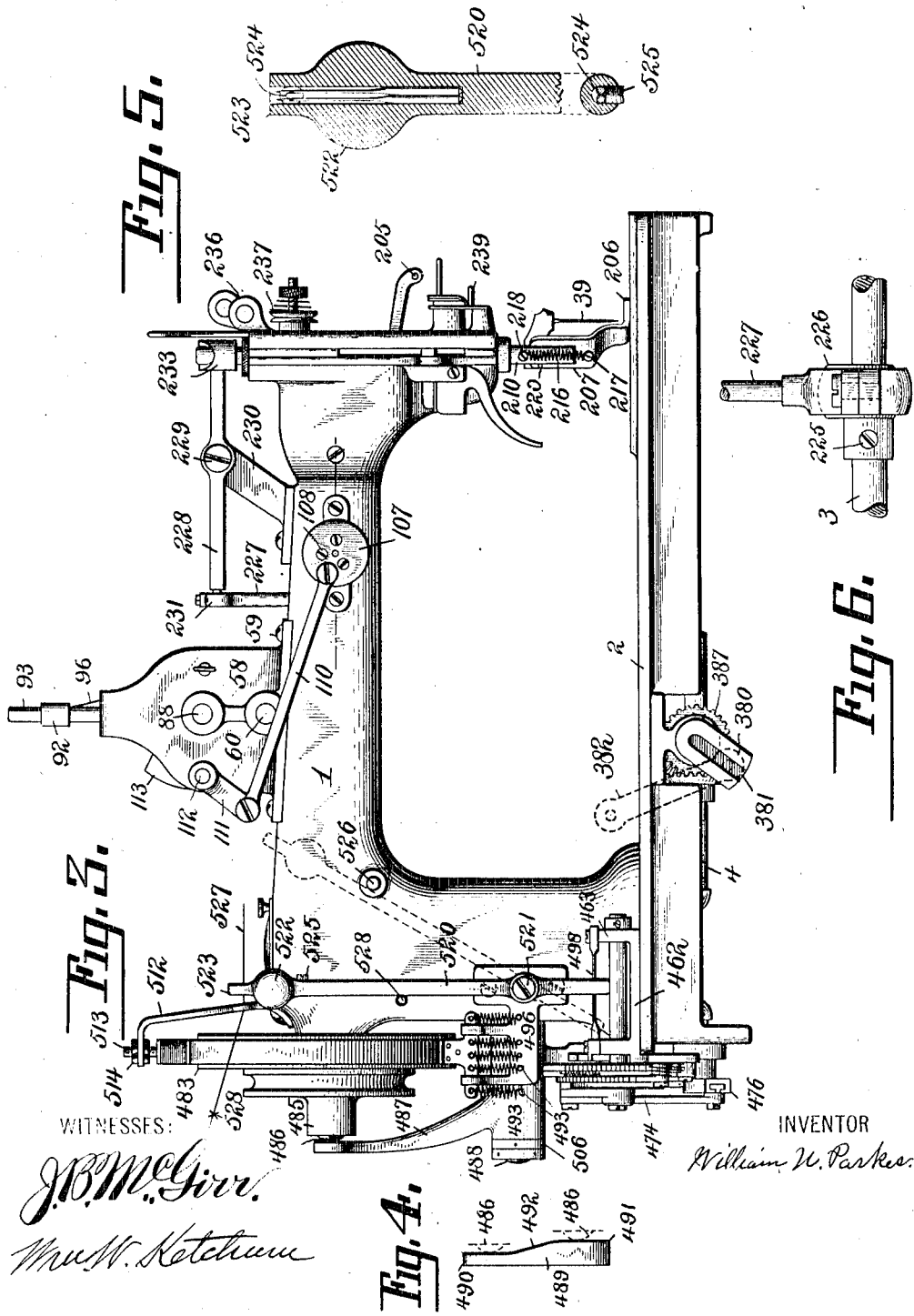

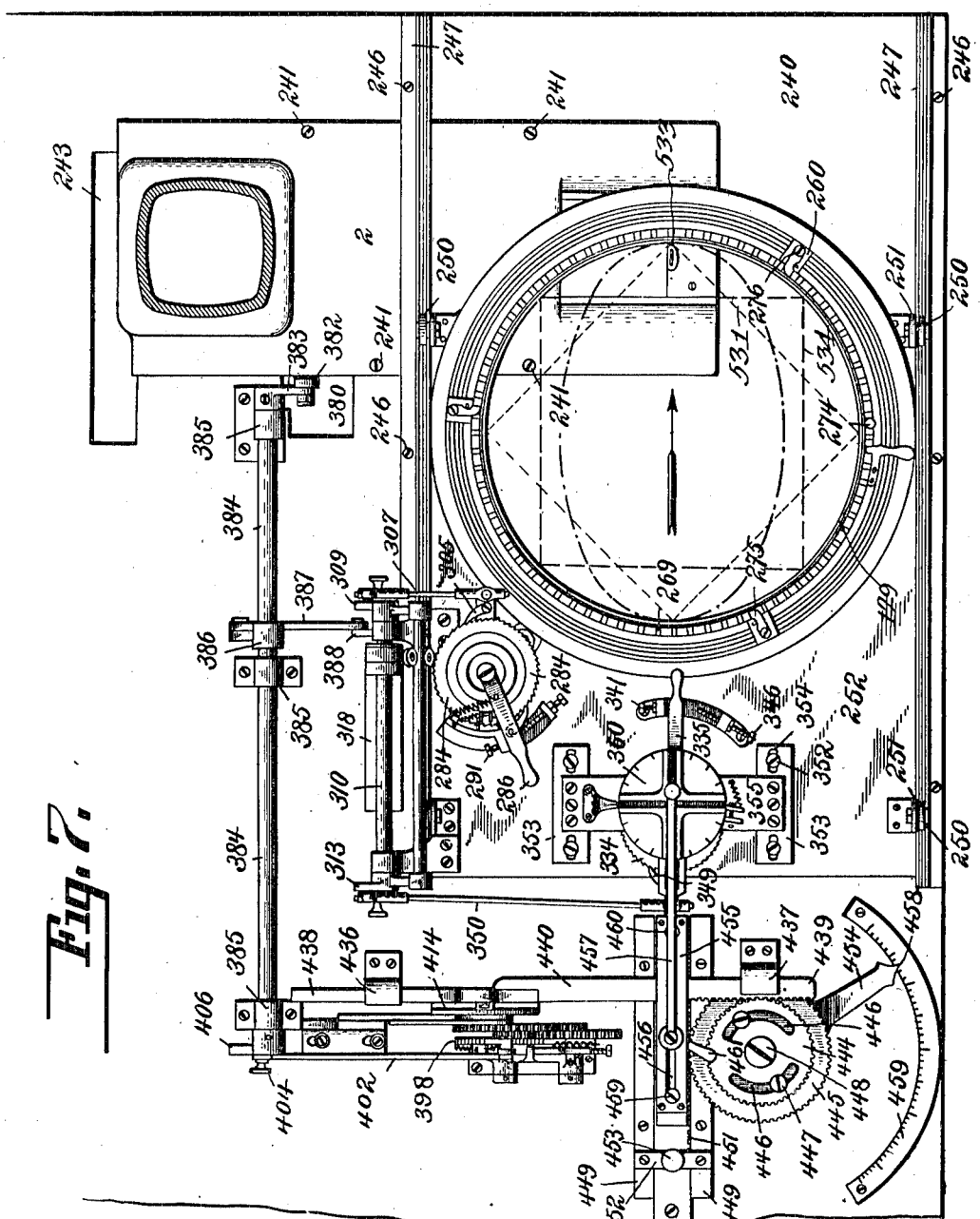

W. N. PARKES.
AUTOMATIC EMBROIDERY OR ORNAMENTAL STITCH SEWING MACHINE.
APPLICATION FILED NOV. 20, 1905.
1,119,449.
Patented Dec. 1, 1914.
19 SHEETS—SHEET 4.
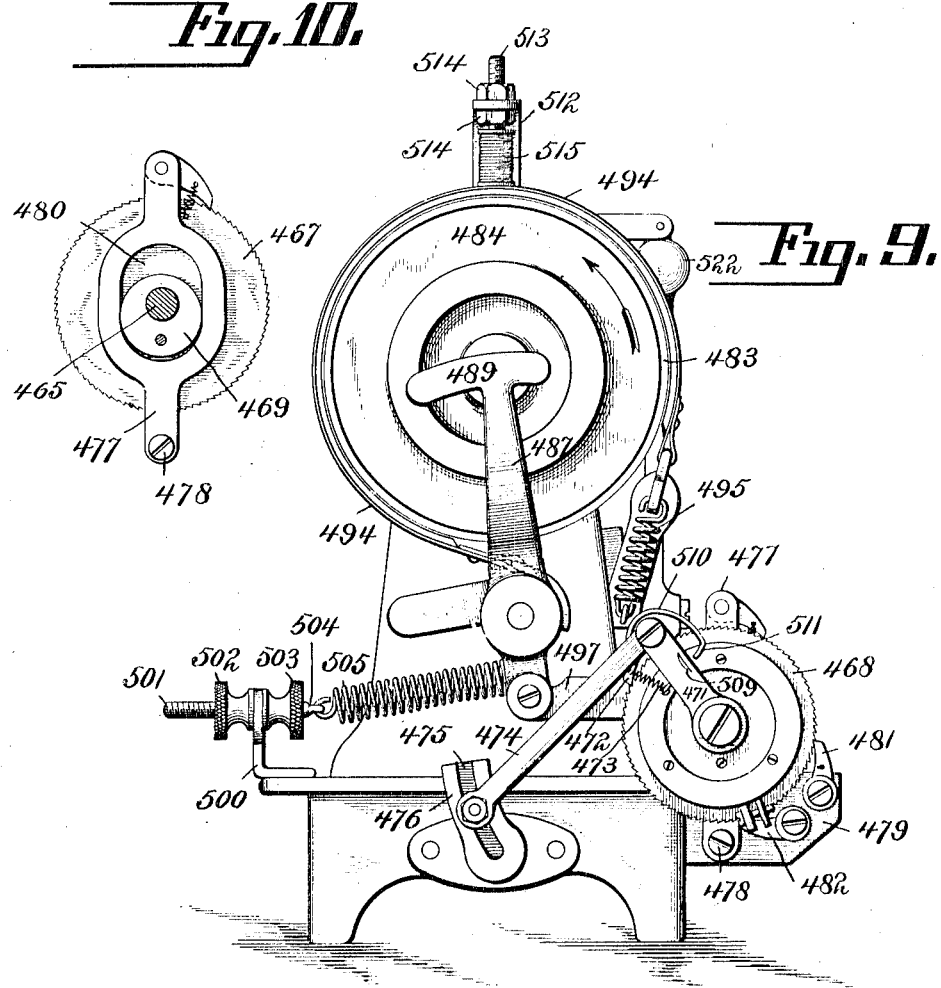
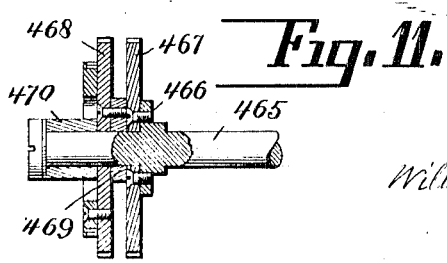

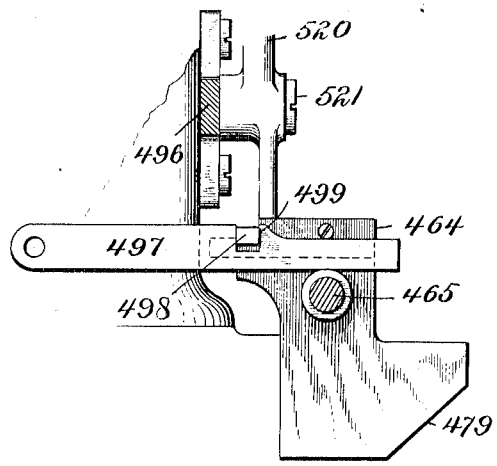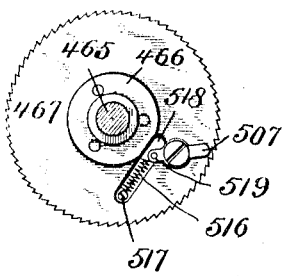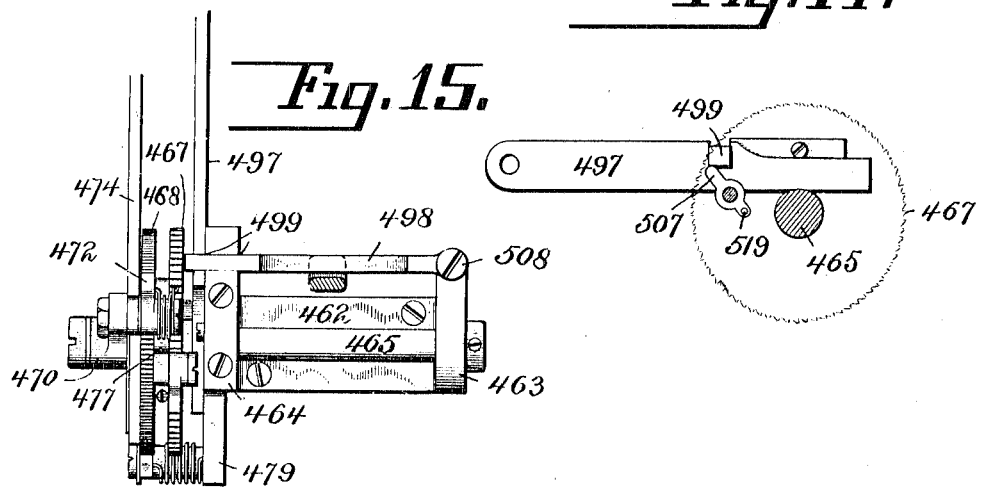

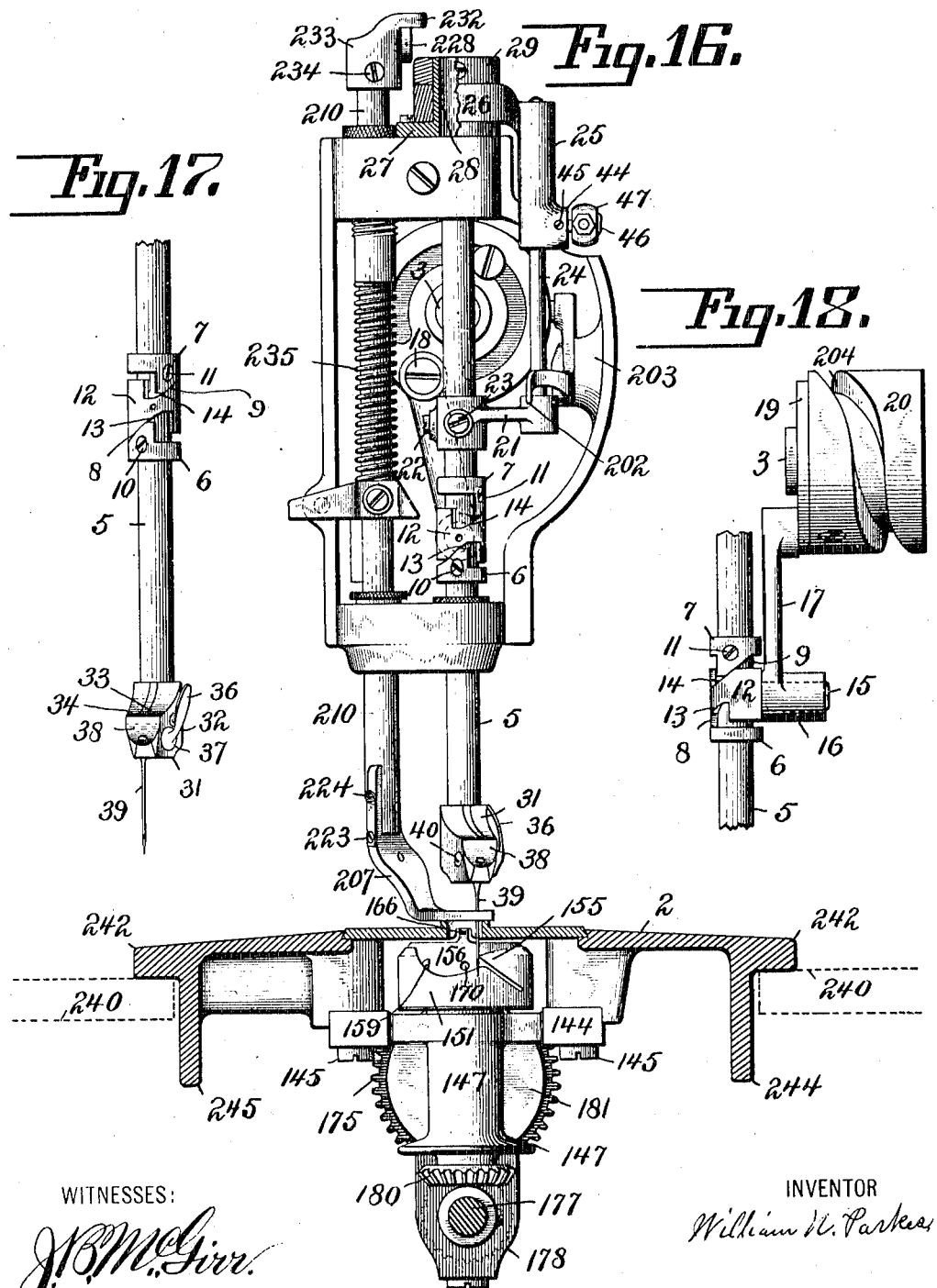

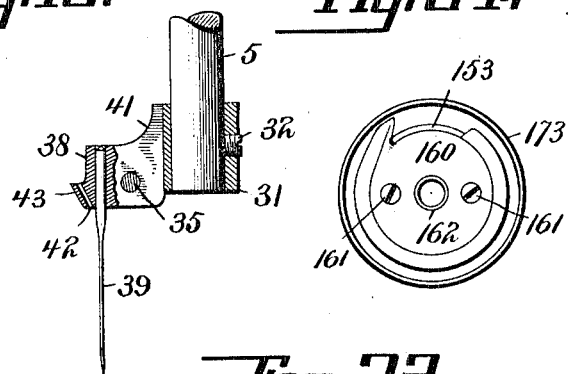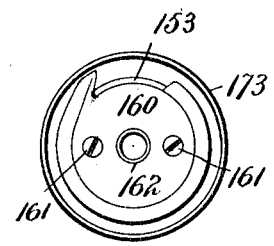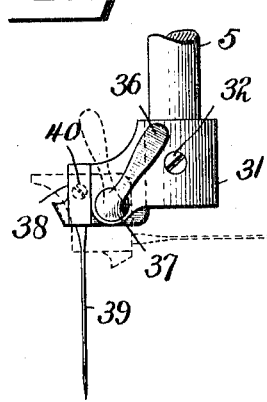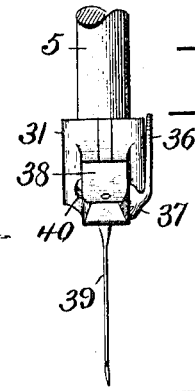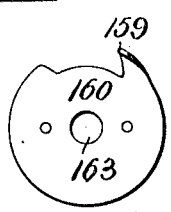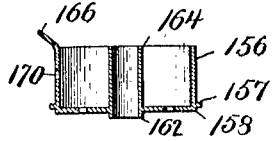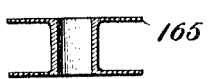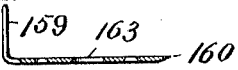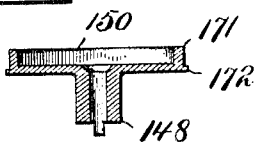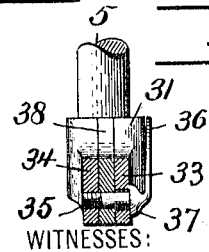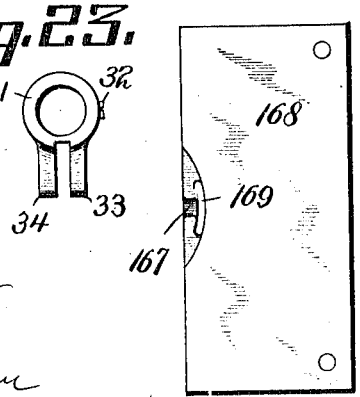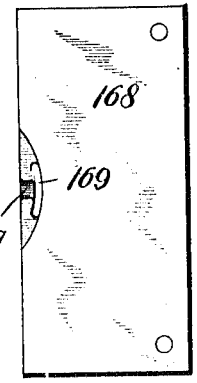

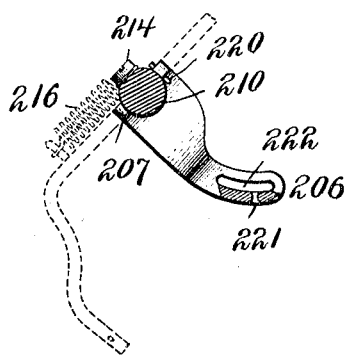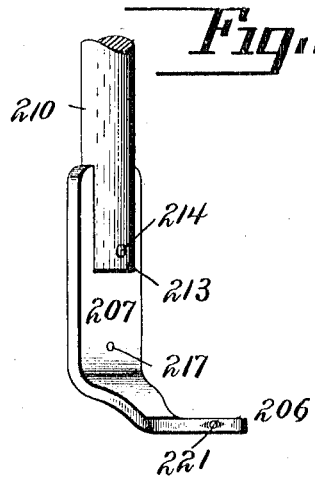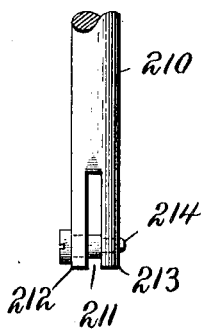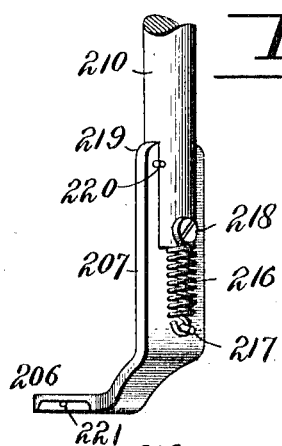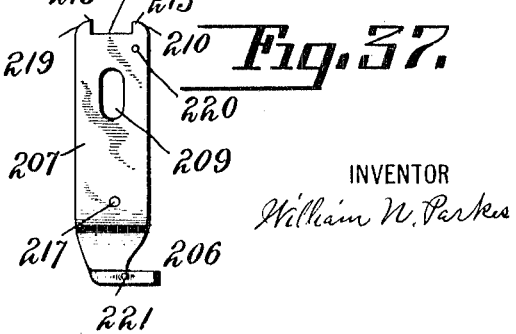

W. N. PARKES.
AUTOMATIC EMBROIDERY OR ORNAMENTAL STITCH SEWING MACHINE.
APPLICATION FILED NOV. 20, 1905.

1,119,449.

Patented Dec. 1, 1914.
19 SHEETS—SHEET 9.

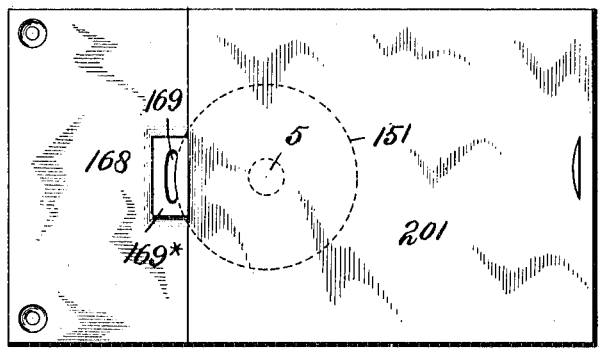
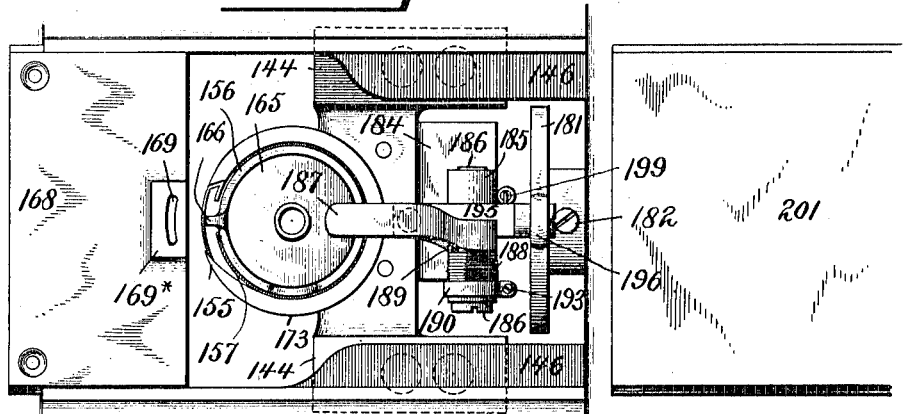

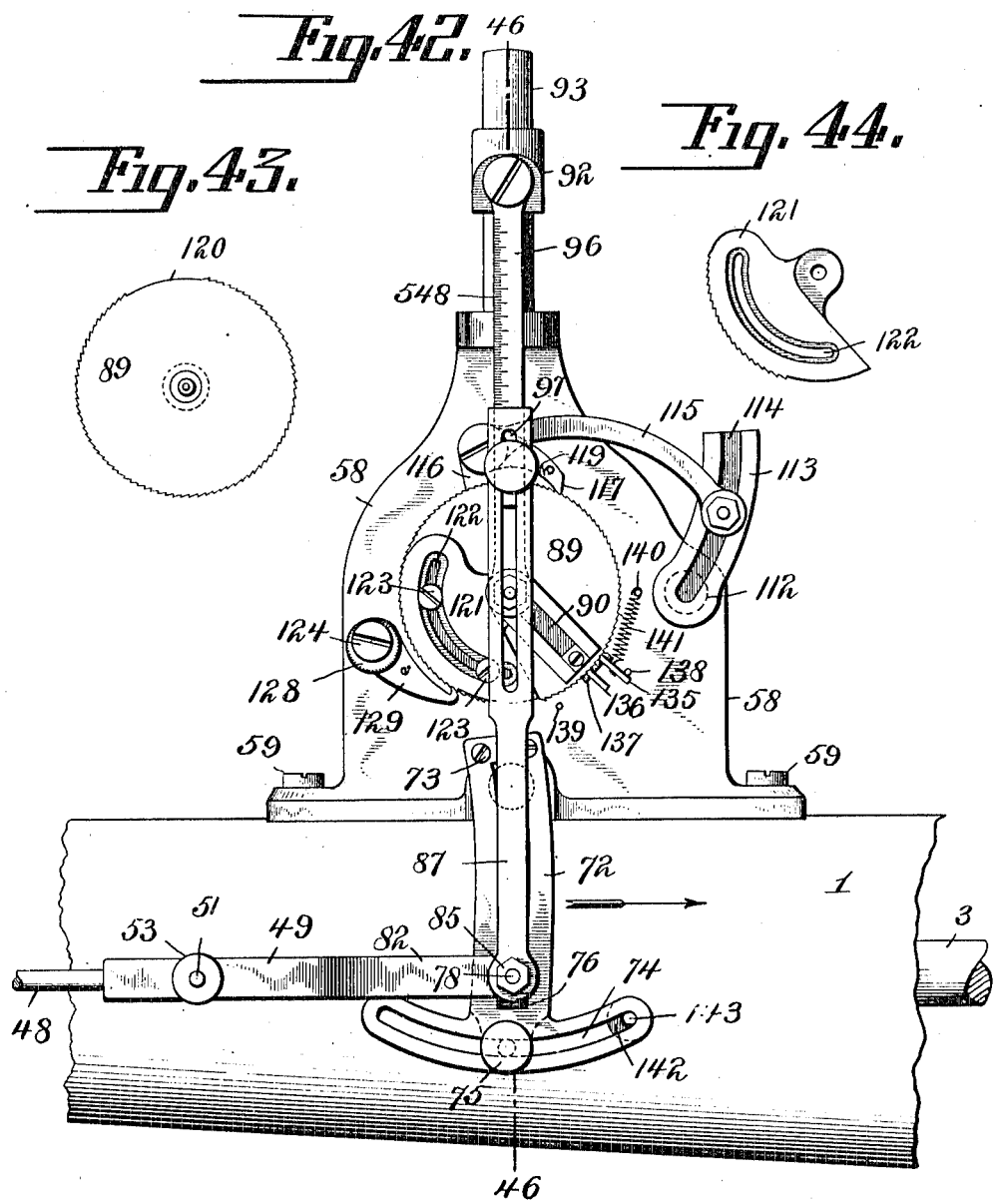

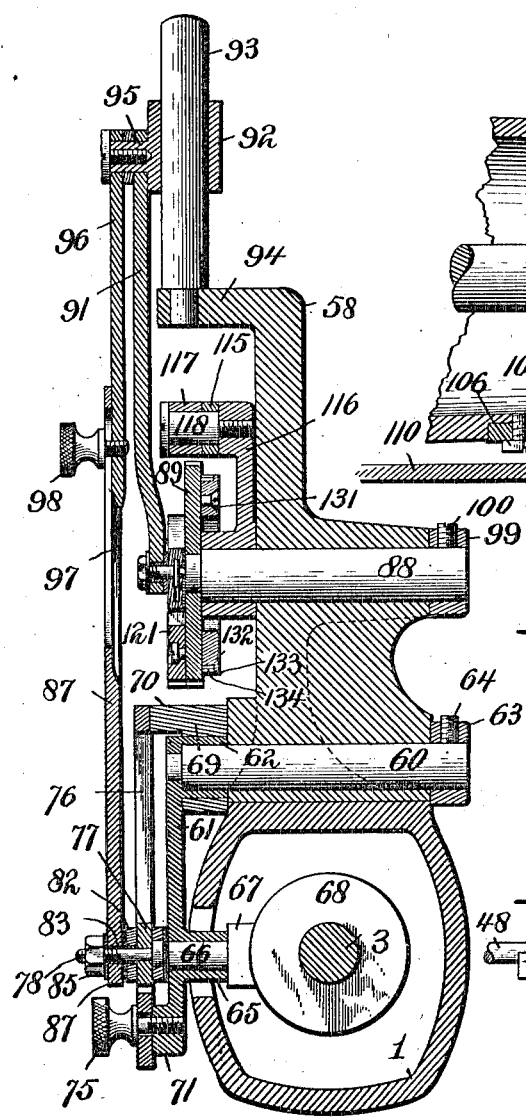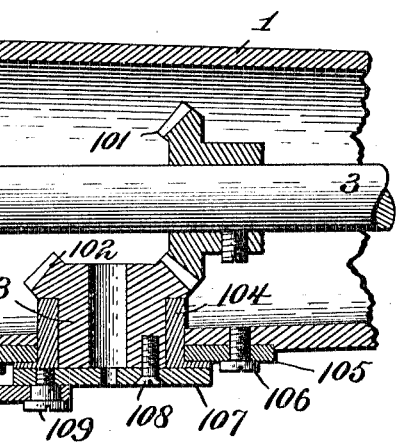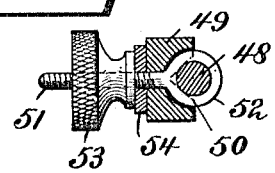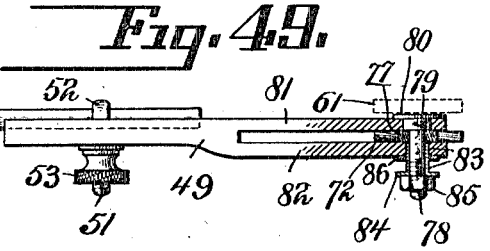

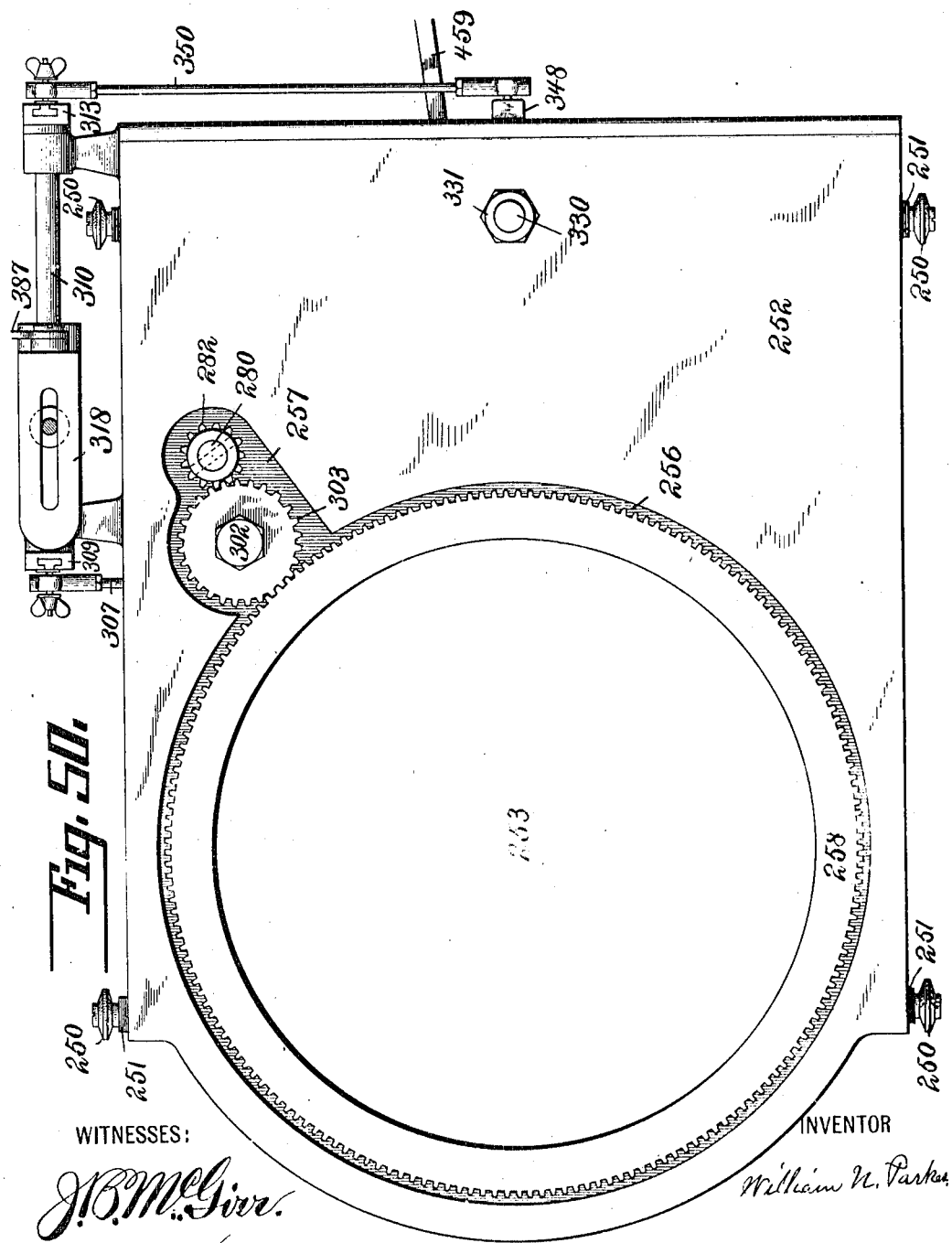

W. N. PARKES.
AUTOMATIC EMBROIDERY OR ORNAMENTAL STITCH SEWING MACHINE.
APPLICATION FILED NOV. 20, 1905.
1,119,449.
Patented Dec. 1, 1914.
19 SHEETS—SHEET 14.
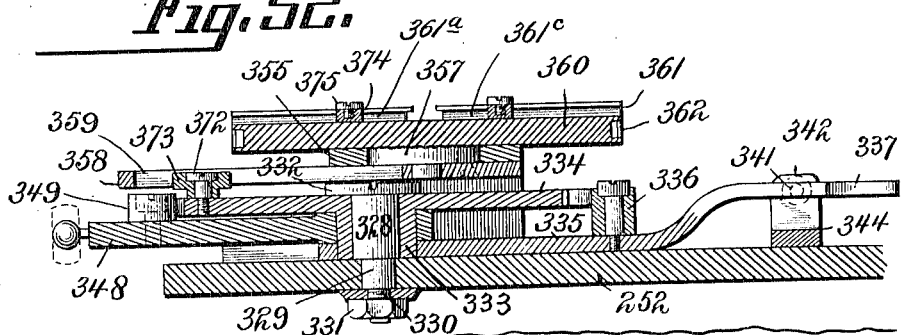
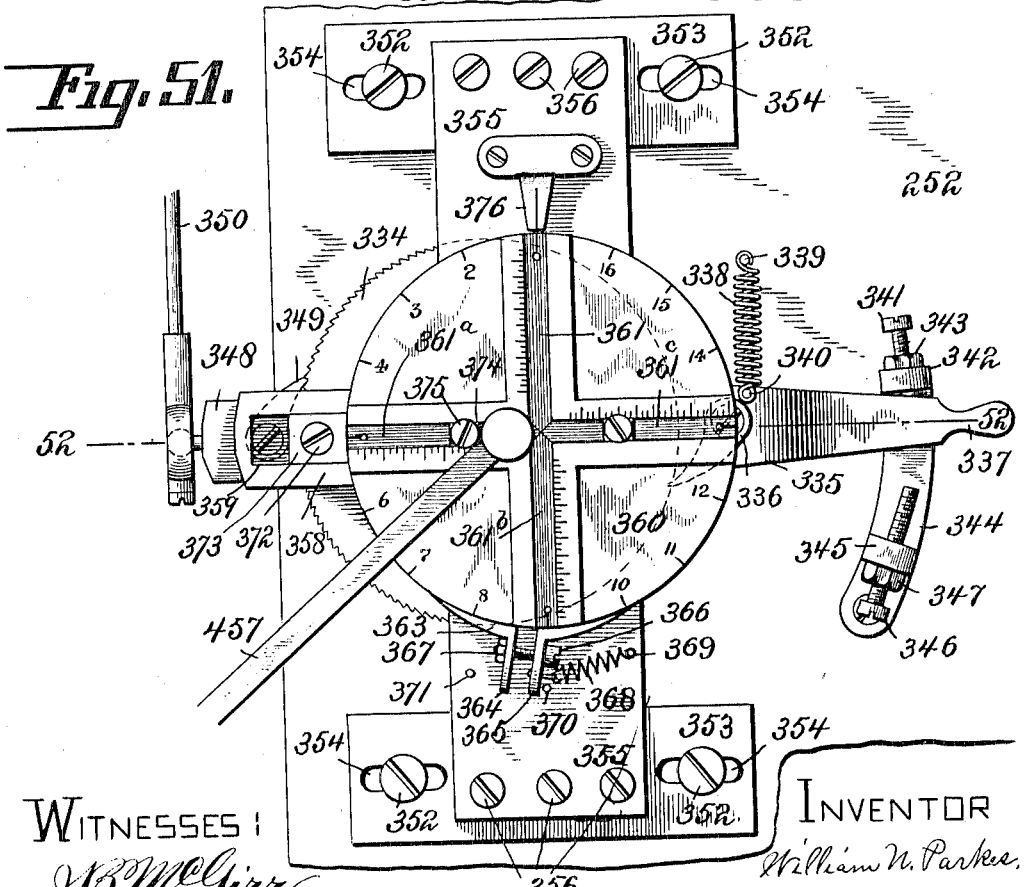

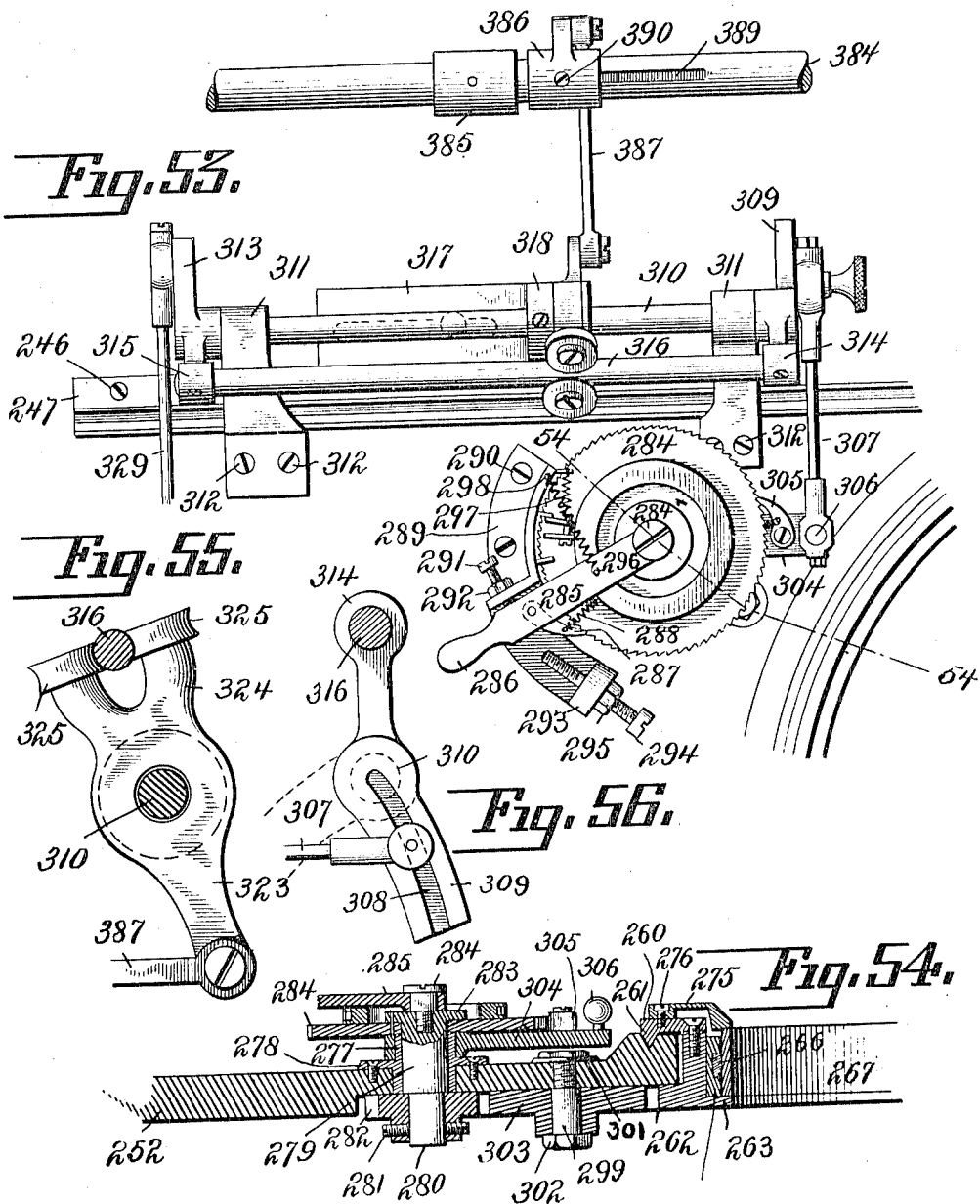

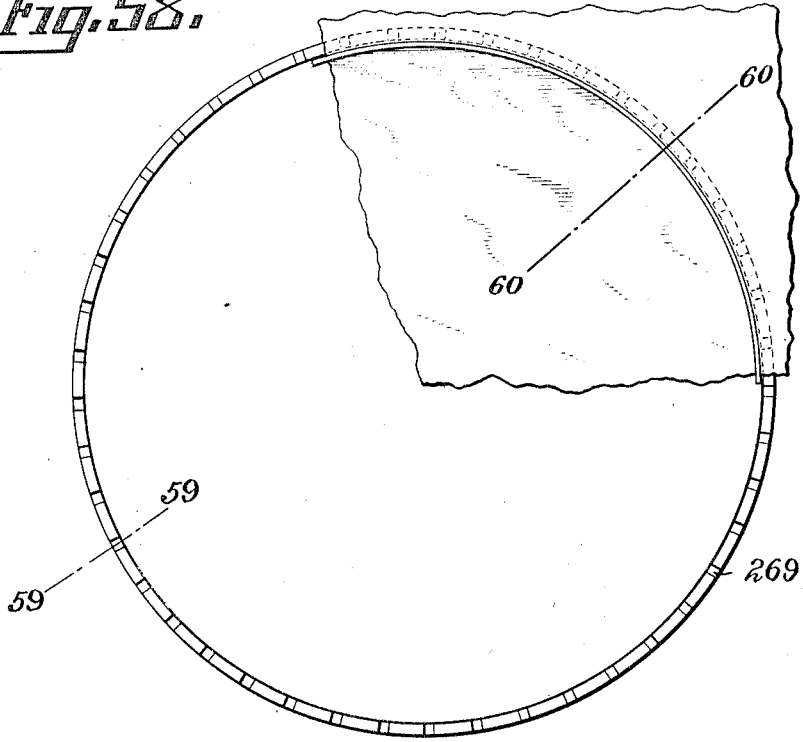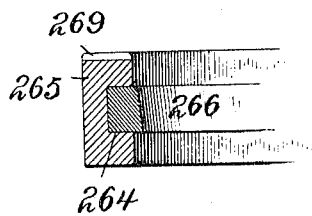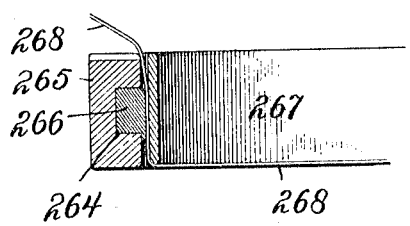

W. N. PARKES.
AUTOMATIC EMBROIDERY OR ORNAMENTAL STITCH SEWING MACHINE.
APPLICATION FILED NOV. 20, 1905.
1,119,449.
Patented Dec. 1, 1914.
19 SHEETS—SHEET 17.
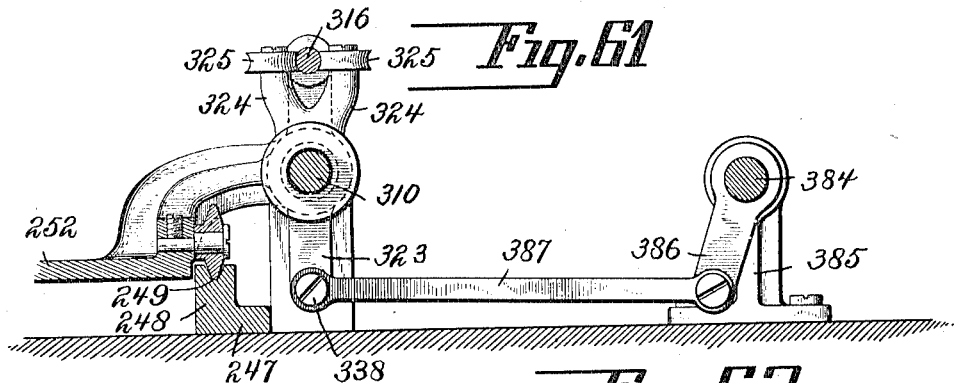
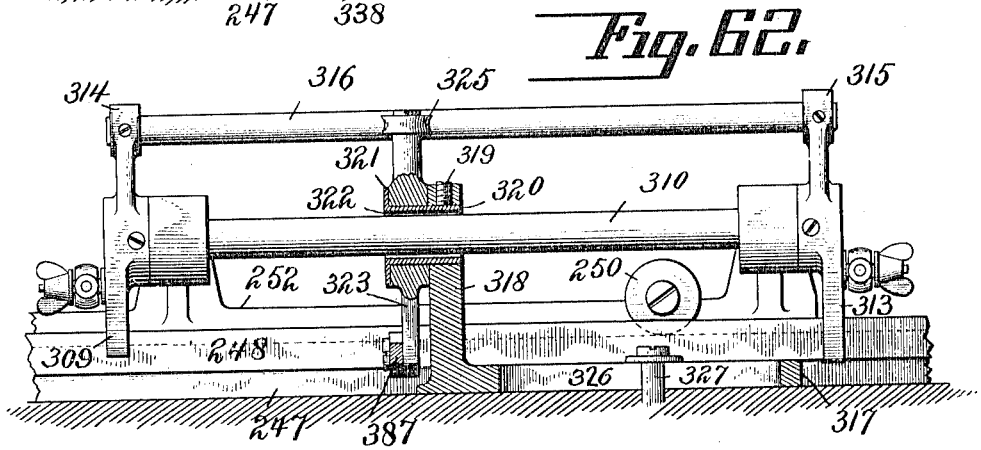
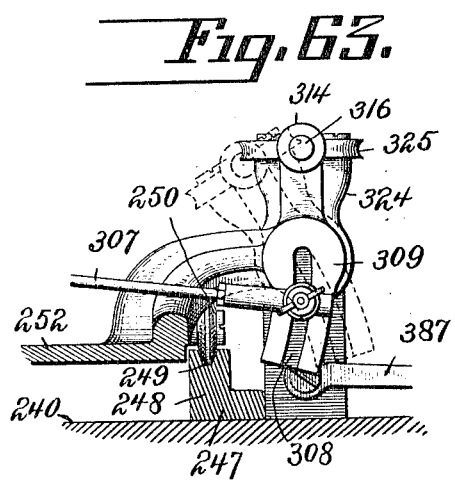
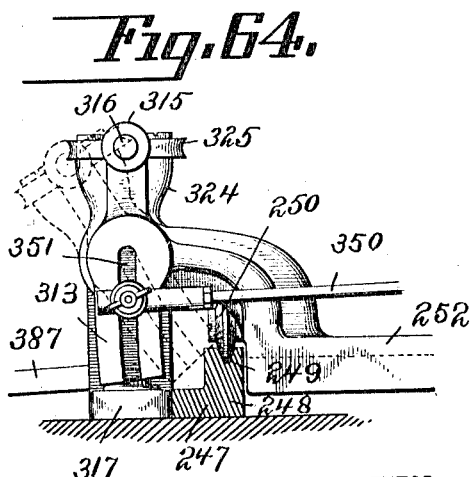
WITNESSES:
J. B. McGirr.
Wm. W. Ketchum
INVENTOR
William N. Parkes.

W. N. PARKES.
AUTOMATIC EMBROIDERY OR ORNAMENTAL STITCH SEWING MACHINE.
APPLICATION FILED NOV. 20, 1905.
1,119,449.
Patented Dec. 1, 1914.
19 SHEETS—SHEET 18.
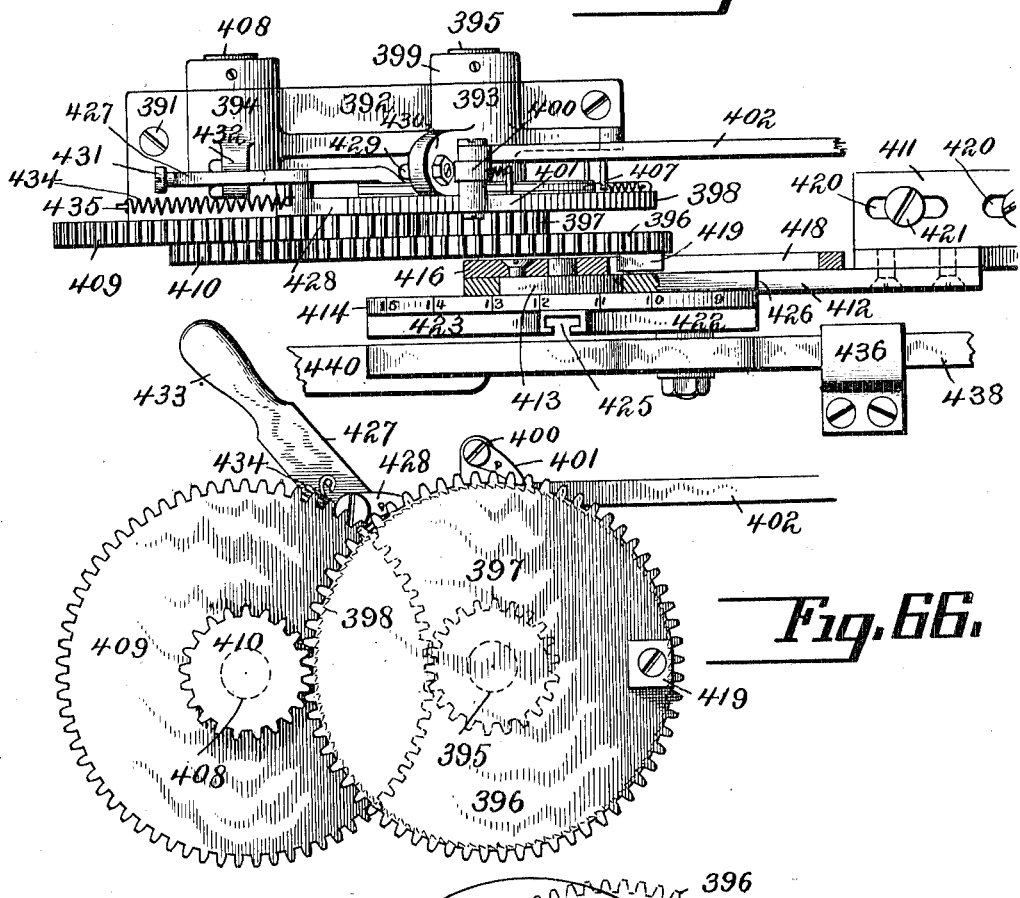
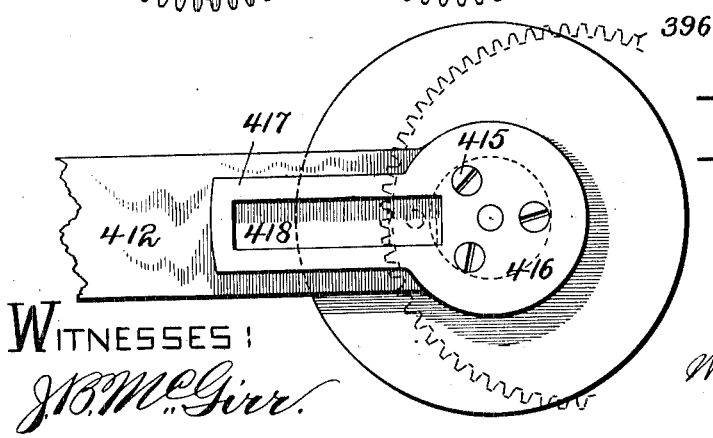
Witnesses:
Inventor
William N. Parkes

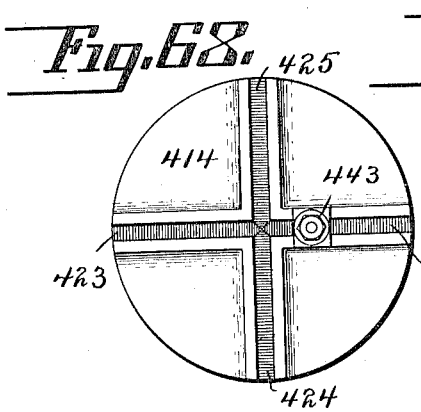
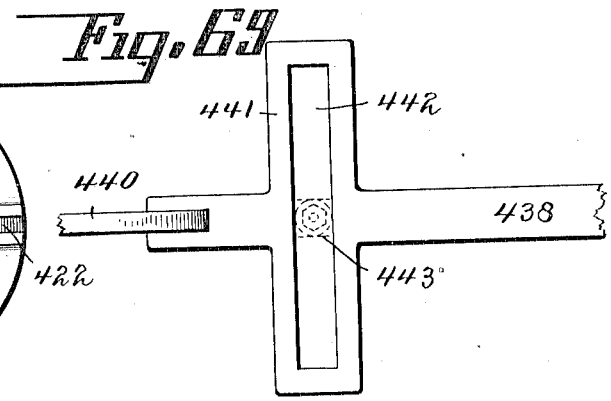
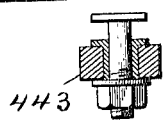
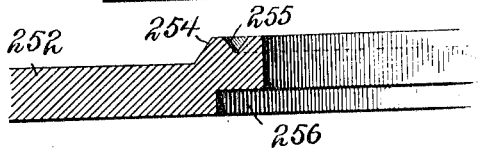
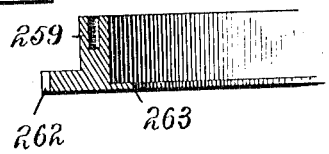
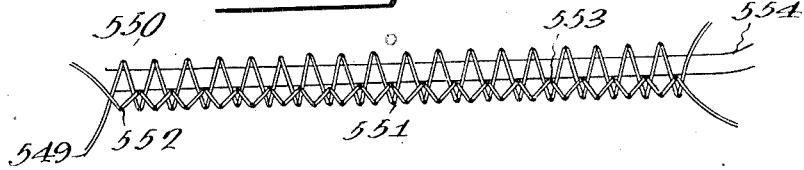

UNITED STATES PATENT OFFICE.

WILLIAM N. PARKES, OF BROOKLYN, NEW YORK, ASSIGNOR TO THE PARKES MACHINE COMPANY, OF NEW YORK, N. Y., A CORPORATION OF NEW YORK.

AUTOMATIC EMBROIDERY OR ORNAMENTAL-STITCH SEWING-MACHINE.

1,119,449.   Specification of Letters Patent.   Patented Dec. 1, 1914.

Application filed November 20, 1905. Serial No. 288,208.

*To all whom it may concern:*

Be it known that I, WILLIAM N. PARKES, a citizen of the United States, residing in Brooklyn, county of Kings, and State of New York, have invented a new and useful Improvement in Automatic Embroidery or Ornamental - Stitch Sewing - Machines, of which the following is a description.

This invention relates to the kind of embroidery or ornamental stitch sewing machines disclosed in Patents #652,326, and 693,666, issued to me June 26, 1900 and February 18, 1902 respectively.

The object of the invention is to improve this class of machines, and to so construct some of the improvements that they may be used in various other machines.

The invention consists of said improvements adapted for use as disclosed in the specification and stated in the claims.

In the drawings, Figure 1 is a front elevation of my machine. Fig. 2 is a detail in connection with the means for adjusting the position of the needle laterally. Fig. 3 is a rear elevation of the head which carries the stitch forming mechanism, stop motion and driving shaft. Fig. 4 is a detail in connection with the stop motion, and Fig. 5 a detail in connection with the thread tripping device of the stop motion. Fig. 6 shows the eccentric and connection with the same, by means of which the presser-bar is reciprocated. Fig. 7 is a top plan view of the mechanism, the arm of the head and stop motion being omitted. Fig. 8 is a segment arm which is attached to the rear end of the shaft 384. Fig. 9 is a rear end view of the head of the machine, showing the position of the stop motion thereon. Fig. 10 is a view showing a detail of the means by which the secondary ratchet wheel is operated from the movement of the driving ratchet 468. Fig. 11 is a view partly in section disclosing the manner in which the stop motion ratchet wheels are constructed and assembled. Fig. 12 is a detail showing the latch and catch by means of which the stop motion is held in its normal position. Fig. 13 is a view disclosing the manner in which the tripping lever 507 is carried by the ratchet wheel 467, and Fig. 14 shows the tripping lever as it commences to engage the latch 498. Fig. 15 is a top plan view of the stop motion ratchet mechanism. Fig. 16 is an enlarged front end view of the head, the face plate being removed to disclose the details of the mechanism for reciprocating the take-up, and the bed plate and needle plate being in section to disclose the looper mechanism and its location. Fig. 17 is a detail view of the needle-bar and needle holder, also operating cams for varying the thrust of the needle attached thereto. Fig. 18 is a side view of the take-up cam, showing the means for reciprocating the needle-bar in connection therewith. Fig. 19 is a view in detail exposing the construction of the movable needle clamp, which is a part of the needle carrier or holder, and Fig. 20 shows the needle clamp and needle in full lines in their operative position, and in dotted lines in their inoperative position. Fig. 21 is a sectional view showing the means by which the movable needle clamp is held in position. Fig. 22 is a front view of the needle carrier, and Fig. 23 is a top plan view of the part of the needle carrier, that carries the movable needle clamp. Fig. 24 is a bottom plan view of the hook, showing the auxiliary hook secured to the bobbin case. and Fig. 25 is a detached top view of the auxiliary hook. Fig. 26 is a sectional view of the hook. Fig. 27 is a sectional view of the bobbin case, and Fig. 28 a sectional view of the bobbin. Fig. 29 is a sectional view of the auxiliary hook. Fig. 30 is the base or head which carries the primary hook. Fig. 31 is a bottom plan view of the needle plate. Fig. 32 is a top plan view showing the presser foot in full lines in operative position, and in dotted lines swung to one side out of its operative position, a part of the presser foot is broken away to expose the way by means of which the filling cord or material is led under the embroidery stitches. Fig. 33 is a view of the lower end of the presser-bar. Fig. 34 is a bottom plan view of the presser foot showing the depression in the same, to permit of the free passage of the embroidery stitches as the work is moved. Fig. 35 is a front view, and Fig. 36 a rear view of the presser foot in its normal position. Fig. 37 is a face view disclosing the construction of the presser foot shank. Fig. 38 is a bottom plan view of the head of the machine, showing the looper driving shaft, and the means by which the looper, and the work moving mechanism is driven from this shaft. Fig. 39 is a top plan view of the needle plate, the dotted lines indicating the location of the looper relative to the needle plate when the latter is in operative position. Fig. 40 is a top plan view of the looper mechanism and bobbin controller, the needle plate and looper covering plate is removed to expose the same. Fig. 41 is a vertical sectional view exposing the construction of the looper mechanism and the bobbin controller, the relative relation of these parts, and the means for driving them. Fig. 42 is an enlarged front view of the mechanism for operating the needle-bar horizontally, and Figs. 43 and 44 are detached parts of the ratchet which drives said mechanism. Fig. 45 is a sectional view of the stop pawl 129 disclosing the adjustable bearings for the same, and the manner in which the parts are assembled. Fig. 46 is a sectional view on lines 46—46 of Fig. 42, and Fig. 47 is a detail in section disclosing the means by which the mechanism for moving the needle-bar laterally is operated from the driving shaft of the machine. Fig. 48 is a sectional view exposing the construction and arrangement of the means by which the parts 48 and 49 are adjustably secured to each other. Fig. 49 is a top view showing the parts 48 and 49 clamped in position, and the end of the part 49 and the parts in connection with the same partly in section. Fig. 50 is a bottom plan view of the work carrier, and work carrier carriage. Fig. 51 is a top plan view of the ratchet mechanism for reciprocating the work carrier carriage, and Fig. 52 is a sectional view on the lines 52—52 of Fig. 51. Fig. 53 is a top plan view of the ratchet mechanism, by means of which the work carrier is rotated, the operating mechanism by means of which said work carrier ratchet mechanism is operated, and the means by which the ratchet mechanism for reciprocating the work carrier carriage is operated. Fig. 54 is a sectional view on the lines 54—54 of Fig. 53. Figs. 55 and 56 are details of the driving mechanism for the work carrier carriage. Fig. 57 is a detail in connection with the work carrier. Fig. 58 is a top plan view of the work clamp. Fig. 59 is a sectional view on the lines 59—59 of Fig. 58, and Fig. 60 is a sectional view taken on the lines 60—60 of the before mentioned figure. Figs. 61 to 64 inclusive are details of the driving mechanism for the work carrier, and work carrier carriage. Fig. 65 is a top plan view of the ratchet mechanism, by means of which the reciprocating position of the work carrier is automatically changed. Figs. 66 and 67 are details of this ratchet mechanism. Fig. 68 is a face view of the disk 414, and Fig. 69 the head which is engaged by the shoe carried by the disk 414. Fig. 70 is a detail showing the construction of the parts in connection with the shoe 443. Fig. 71 is a cross sectional view showing the construction of the part of the work carrier carriage in which the work carrier is located and Fig. 72 is a cross sectional view of the work carrier rack. Fig. 73 shows a diagrammatic view of the stitch made.

In the drawings, 1 represents the arm of the head of the machine, and 2 the base to which said arm is attached, 3 the driving shaft, and 4 the lower or looper operating shaft. In suitable bearings in the forward end of the machine is mounted a needle-bar 5, to which is attached cam parts 6 and 7. On said cam parts are formed cams or inclined surfaces 8 and 9. The said parts are secured to the needle-bar by screws 10 and 11. Intermediate the cam parts 6 and 7 is mounted a cam part 12 on which is formed cam or inclined surfaces 13 and 14. The part 12 has a round portion 15 formed on it which is located in a bore 16 formed in the lower end of a link 17, the upper end of said link being journaled on a crank pin 18 which is carried by the disk 19, the latter being in turn adjustably attached to a take-up cam 20. An arm 21 is attached by means of screws 22 and 23 to the needle-bar 5. In the outer end of said arm is secured an upwardly extending rod 24, which is adapted to reciprocate in a downwardly extending bearing 25, formed on a lever 26. To the arm of the machine is attached a bearing 27 which has an upwardly extending sleeve portion 28, on which is pivoted the lever 26, the location of these parts being such that the axis of the lever is concentric with the axis of the needle-bar. A collar 29 is attached by means of a screw 30, to the upper end of the sleeve 28, and this collar serves as a means for retaining the lever 26 on its bearing. The part 28 is provided with a bore through which the needle-bar 5 reciprocates. It will now be understood that if the shaft 3 be revolved the needle-bar will be reciprocated and free to turn on its axis. It is also to be understood that if the needle-bar be turned on its axis the part 12 will be held from turning with the bar by reason of the connection between the said part and the link 17, and consequently as the bar turns the inclined surfaces on the part 6, 7 and 12 will cause the vertical position of the bar to be changed. In a machine of this character it is desirable under certain conditions, to move the needle out of its vertical position for the purpose of giving proper clearance for the placing of the work in the work carrier, and the removal of the same from the carrier. It is also desirable at times, to throw the needle out of operative position so that the machine may be run a pre-determined distance without stitching, and for the purpose of bringing the work around to a desired position, or for the purpose of embroidering disconnected patterns, or for other purposes. The needle-carrier provided for this machine is so constructed that the needle may be readily swung out of the way for the purposes mentioned or for any desired purpose, and in swinging the needle out of the way its position in the carrier is not changed, and the needle need not be unthreaded.

The needle-carrier or holder will now be described. The needle-bar 5 carries a needle-holder 31 which is secured thereto by means of screws 32. The needle-holder is provided with lugs 33 and 34. A part 35 passes freely through lug 33 and has a threaded seat in lug 34, said part 35 is provided with an arm 36 and an enlarged portion 37 which abuts against the lug 33. On the part 35 is pivoted a needle-holder 38 which carries a needle 39, the latter being secured in said clamp by means of a screw 40. The needle clamp is provided with an upwardly extending abutting portion 41, which engages the part 31, as shown in Fig. 19. A way 42 is formed through a boss 43 in the needle clamp, and this way serves as a means for leading the thread to the needle. The clamp 38 is adapted to swing on the part 35, as illustrated in Fig. 20. In said figure the needle clamp and needle are shown in full lines in their operative position, and they are shown in dotted lines in said figure in an inoperative position. The part 35 and the handle 36 serves as a means for clamping the needle clamp 38 in position. When the needle is adjusted to a desired position, the lugs 33 and 34 are drawn together by means of the part 35, and thereby caused to clamp and securely hold the needle clamp 38. The needle clamp and needle are located eccentrically with respect to the axis of the needle bar 5, and consequently when the needle bar is turned on its axis the needle is moved laterally.

I will now describe the preferred means which I have provided for oscillating or turning the needle-bar on its axis. In a boss 44 is secured by means of a screw 45 the stem of a ball 46, which latter is embraced by the end 47 of a connection or rod 48. In a part 49 is formed a V shaped groove 50, in which the free end of the rod 48 is located. This rod 48 is clamped and held adjustably into the groove by means of a part 51 on which is formed an enlarged head 52, through which the rod 48 passes. The stem of the part 51 passes through a hole in the part 49, the outer portion of said stem is threaded and on said threaded portion is located a thumb nut 53, a washer 54 being located between the part 53 and said thumb nut. (See Figs. 48 and 49.) This connection between the rod 48 and the part 49 serves as a means for readily adjusting the part 48 relative to the part 49, and thereby changing laterally the working position of the needle. On the rod 48 is located a stop 55 which is secured thereon by screws 56, the stop being adjustable longitudinally on the rod. In the rod 48 is a notch 57. The object of this notch and the stop 55 is for the purpose of pre-determining the lateral adjustment of the needle, the notch serving as a means for locating the needle in one position and the stop 55 as a means for pre-determining the extent of lateral adjustment of the needle. The part 55 is placed the desired distance from the notch 57 that is desired to adjust the needle laterally, after which it is secured by means of the screw 56 to the rod. In adjusting the needle laterally after the stop has been secured in its proper position the thumb nut 53 is loosened, and the rod 48 is moved until the stop 55 abuts the end of the part 49, after which the parts are again secured into their proper position by the thumb nut 53.

To the arm of the machine is secured a bracket 58 by means of screws 59, and in the said bracket is located a short shaft 60 disposed longitudinally at right angles to the driving shaft 3 of the machine. To the forward end of the shaft 60 is attached a lever 61 on which is formed a sleeve 62 which is integral with the lever. On the rear end of the shaft 60 is a collar 63 which is secured thereto by means of a screw 64, this collar serves as a means for retaining the shaft 60 in its position in the bracket 58. On the rear of the lever 61 is formed a boss 65 in which is located a stem 66 of a shoe 67, the shoe being in engagement in a usual manner with a switch cam 68 that is carried by the shaft 3 of the machine. On the sleeve 62 is mounted a part 69 adapted to turn on the said sleeve, the said part having an extended portion 70 thereon. On the lower portion of the lever 61 is formed a boss 71. To the part 70 is attached an inverted T-shaped part 72 by means of screws 73. In the lower end of the said part is formed a groove 74 which is concentric with the axis of the shaft 60, a thumb screw 75 passes through the groove or way 74 and has a seat in the boss 71. (See Fig. 42.) The thumb screw serves as a means for securing the part 72 to the lever 61 and the segmental groove 74 permits the lateral adjustment of said part on said lever, it being understood that the part 69 is free to turn on the part or sleeve 62. In the part 72 is formed a segmental groove or way 76 which is concentric with the axis of the pivot of the part 47 which pivot is the ball 46. In the way 76 is located a shoe 77 which is adapted to slide therein. A bolt 78 having an enlarged portion 79 and head 80 passes through the shoe 77. The part 49 is forked as shown in Fig. 49, and a leg 81 of said fork has a bearing on the enlarged portion 79 of the bolt 78 and the other leg 82 of the fork has a bearing on a bushing 83, which latter is in turn mounted on the reduced portion of the bolt 78. The bushing 83 has a flanged portion formed thereon as at 84, and a nut 85 located on the threaded portion of the bolt 78 serves as a means for locking the parts into position. A washer 86 is located next to the leg 82 and the bushing or sleeve 83, and intermediate of said washer and the flange 84 on the sleeve 83 is located the lower end of a link 87.

It is now to be understood that by means of the nut 85 and the enlarged portion 79 of the bolt 78, the sleeve, shoe and bolt are rigidly clamped together. The shoe 77 engages the enlarged portion 79 of the bolt 78 and the sleeve 83 engages the shoe 77, and the nut 85 engages the flanged portion 84 of the sleeve 83, and thus it is seen these parts are adapted to be clamped together as before mentioned. The portion 79 is of such length that the leg 81 of the part 49 is free to turn thereon and the sleeve 83 is of such length that the leg 82 and the lower end of the link 87 are free to turn thereon when the before mentioned parts are clamped together. Assuming now, for example that the part 49 is held in the position on the auxiliary part of the lever 61, shown in Fig. 42, and the machine is started, it will be understood that the said lever 61 will be vibrated by the cam 68, and that by means of the connections between said lever and the arm of the lever 26, the latter will be vibrated on its pivot, and that by reason of the connection between the arm 25 and the arm 21 the latter will be vibrated and through it the needle-bar will be oscillated or turned on its axis. As the needle is located eccentrically with respect to the axis of the needle-bar, the needle will of course, be moved laterally as the needle-bar is turned on its axis.

I will now describe the means by which the extent of the lateral movement of the needle is automatically changed. In the bracket 58, is located a shaft 88 to the forward end of which is attached a needle positioning ratchet wheel 89. In a way 90 on the side of said ratchet wheel is adjustably connected the lower end of a link 91, the upper end of said link being connected to a bearing 92 which latter is adapted to reciprocate on a post 93 carried by an overhanging portion 94 of the bracket 58. On the part 92 is formed a bearing 95, on which the upper end of the link 91 is pivoted. On the said bearing or reduced portion 95 is also pivoted the upper end of a link or part 96 the lower end of which link is adjustably connected to the link or part 87. The adjustment between the parts 91 and 87 is secured by means of a slot 97 which is formed in the part 87 and a thumb screw 98 which passes through said slot and has a seat in the part 96. A collar 99 which is secured to the shaft 88 by means of a screw 100 serves as a means for retaining the shaft in its bearing. On the driving shaft 3 is secured a bevel gear 101 which meshes with a gear 102, the latter being provided with a hub 103 which is located in a sleeve 104, the sleeve being rigidly connected to a plate 105, which latter is secured to the arm of the machine by screws 106. A disk 107 is attached to the hub 103, by means of screws 108, said disk serving as a means of retaining the bevel gear 102 in its bearing 104. The disk 107 carries a crank pin or stud 109 on which is pivoted one end of a link 110, the other end of said link being connected to an arm 111, which latter in turn is attached to a shaft 112. To the forward end of the shaft 112 is attached an arm 113, in which is formed a way 114, one end of a pawl lever link 115 being adjustably connected in said way, and the other end of said pawl lever link being connected to the lever 116 by means of a stud 118 which has a seat in the lever as shown in Fig. 46. A spring 119 is suitably attached to the pawl and the pawl lever to hold the pawl in engagement with the ratchet wheel 89. A gap 120 is in the teeth of the ratchet wheel and a segment 121 on which the teeth are formed, is adjustably connected to the side of the ratchet wheel 89, by means of a slot 122 in the segment and screws 123 which pass through the slot into the wheel and thereby secure the segment to the wheel. The segment is suitably pivoted to be adjusted circularly about the axis of the ratchet wheel, the teeth on the segment being co-incident with the teeth on the ratchet wheel so that the gap in the teeth on the wheel may be adjustably extended or closed by the adjustment of the segment about the axis of the ratchet.

It will now be understood that when the machine is operated, the lever 61 is oscillated by means of the switch cam 68, and that by means of the connections between the part 76 of the lever and the needle-bar, the latter is oscillated on its axis, and the needle thereby moved laterally about the axis of the needle-bar. The switch cam is constructed in a usual manner, and the usual lateral movement is transmitted from the same to the needle, that is, the needle is moved laterally each time it reciprocates, and this movement of the needle takes place while it is disengaged from the work. Through the connection between the ratchet wheel and the end of the part 49, said end is reciprocated on the part 76 of the lever 61, and this reciprocation of said end on said part increases and decreases the extent of the oscillation of the needle-bar, and through it, the extent of the lateral movement of the needle. As the end of the part 87 moves toward the pivot of the lever 61, the extent of the lateral movement of the needle is decreased and vice versa.

The object of the transmission of the movement of the ratchet wheel to the part 92, and from this part to the part 49, instead of transmitting said movement direct from the ratchet wheel to the part 49, will be explained in connection with the general explanation of the workings of the machine. In the sewing machines in which ratchet wheels are used and stop pawls in connection with them, it is desirable to have the stop pawl under adjustment relative to the teeth of the wheel. This is especially desirable in a machine of the kind that forms the subject matter of this application for the reason that a number of separate ratchet operated mechanisms are used which must run in time with each other in order to have the embroidered designs match properly and therefore an accurate movement of each wheel is very desirable.

Referring now to the adjustable means for the stop pawl, the numeral 124 indicates a clamping screw which has a seat in the bracket 58. On the said clamping screw next to the bracket is located a bearing 125 on which is formed flange 126, and next the flange is located an eccentric 127, on which is formed a flange 128. On the eccentric 127 is pivoted a stop pawl 129 which latter is adapted to engage the teeth of the ratchet wheel 89, and prevent retrograde movement of the same. On the sleeve or bearing 125, is suitably located a stop pawl spring 130 which is adapted to hold the stop pawl in engagement with the teeth of the ratchet wheel. The space between the flange 126 and the flange 128 is of such extent as to permit the free movement of the stop pawl 129 and the space between the flange 126 and the bracket serves as a means for properly retaining the spring 130 in an operative position.

In the adjustment of the foregoing device, the clamping screw 124 is loosened and the eccentric is adjusted circularly about said screw until the stop pawl is properly located relative to a tooth of the ratchet wheel, at the finishing of an actuating stroke of the actuating pawls, after which the eccentric is rigidly clamped in position by means of the clamping screw.

The means provided for controlling the movement of the ratchet wheel and preventing the same from throwing ahead, will now be described. To the rear side of the ratchet wheel 89 is secured by means of screws 131 a ring bearing 132. On the outer side of the periphery of said bearing is formed a flange 133, and intermediate of said flange and the ratchet wheel is located a friction strap 134. The said friction strap encircles the bearing 132 and has extending therefrom ends 135 and 136. A screw 137 passes freely through the extending end 135 and has a seat in the extending end 136; this screw serves as a means for adjusting the extent of the tension or friction between the bearing and the friction strap. The extending ends 135 and 136 are located between pins 138 and 139. On a pin 140 is connected one end of a spring 141, the other end of said spring being connected to the extending part 135 of the friction strap or band. It is to be noted that the spring 141 draws on the friction band in a direction opposite to that in which the ratchet wheel rotates, and normally holds the strap in contact with the pin 138.

In the operation of the machine, the ratchet wheel carries the friction band ahead until the tension of the spring 141 is greater than the friction between the strap and the bearing, and thus a yielding force is exerted on the wheel in the opposite direction to its forward movement, and the wheel is always drawn back into contact with the stop pawl. It will be understood that as the needle-bar is moved laterally from the movement of the ratchet wheel, that this friction device insures the proper lateral location of the needle-bar from each stroke of the ratchet wheel. As the ratchet wheel operates during the time the needle is out of engagement with the work, and as the friction device holds or draws the ratchet wheel back against the stop pawl before the needle reaches the work, it is seen that the lateral position of the needle from the movement of the ratchet wheel is controlled. The use of this friction device in combination with the stop pawl insures an accurate positioning laterally of the needle from the movement of the ratchet wheel. In my present application, I desire to protect said friction device adapted to control the movement of the ratchet wheel and the lateral movement of the needle in combination therewith. I also desire to protect the specific construction of this device and its adaptation for use in my automatic embroidery machine. The means for moving the needle laterally and automatically changing the extent of such lateral movement has been described, and means for automatically changing the working position of the laterally moving needle has also been described. The further workings of this mechanism will be explained under the general description of the operation of the machine.

The means provided for moving the needle laterally directly from the movement of the ratchet wheel, will now be described. On the side of the arm of the machine is located a boss 142, which is provided with a threaded bore 143. The face of the boss 142 is parallel with the face of the boss 71. In adjusting the machine so as to move the needle laterally directly from the ratchet wheel, the thumb nut 75 is removed from the boss 71, and located in the boss 142 through the way 74 in the part 72, and by this means, the part 72 is disconnected from the lever 61, and rigidly connected to the boss 142. The bore 143 is so located relative to the way 74 that the part 72 may be adjusted laterally around the axis of the shaft 60. As the part 69 is located to turn on the sleeve 62, it is of course understood that under the adjustment just mentioned, the lever 61, is free to vibrate when the part 72 is disconnected from the same and rigidly connected to the boss 142. To cause the ratchet wheel 89 to move the needle laterally, the lower end of the link 91 is adjusted in the way 90, away from the axis of the ratchet wheel. This causes the ratchet wheel as it revolves to reciprocate the end of the connection 49 in the way 76 of the part 72. The part 72 is adjusted laterally so as to bring the location of the same in a direction that is oblique to the vertical. It will be thus understood that when the part that is located in the way 76 is reciprocated therein it will move laterally the extent that the way 76 is oblique to a vertical line. The lateral movement of the part in the way 76 is transmitted to the needle by means of the connection between the same and the needle. The extent that the part 72 is adjusted laterally will of course determine the obliqueness of the way 76, and the extent that the needle will be moved laterally. The extent of the reciprocation of the part in the way 76 is of course determined by the distance the lower end of the link 81 is located in the way 90 from the axis of the ratchet wheel 89. The number of lateral stitches in a given direction is determined by the extent of the stroke of the pawl 117, and the length of these lateral stitches is determined by the obliqueness of the way 76 relative to a vertical line and the extent of the reciprocation of the part in the way 76.

The looper mechanism which is provided for coöperation with the needle, and the mechanism for operating the needle vertically, will now be described. The looper used in this machine is fully shown and described in my United States Patent No. 730,692, dated June 9, 1903. This looper mechanism was originally designed for use in my present machine, and it is designed to protect it as adapted for use in the same. In the said patent this looper is shown in use in combination with a reciprocative needle that is not moved laterally, and in a machine that is adapted to do only plain straight way stitching. In my co-pending application No. 93,037, filed February 7, 1902, I disclosed this looper adapted for use in combination with a laterally vibrating needle, but I do not disclose in the said co-pending application work moving mechanism adapted to coöperate with this looper mechanism in combination with a laterally moving needle. As before stated, this looper mechanism was originally designed for the automatic embroidery machine which is now being disclosed. It has many advantages in combination with a laterally vibrating needle and work moving mechanism adapted to coöperate with the same. It is desired to broadly protect this looper mechanism adapted to coöperate with a laterally moving needle, and a work moving mechanism adapted to coöperate with the said looper mechanism and the lateral moving needle.

Referring now to the construction of the looper mechanism, the numeral 144 represents a bracket which is suitably attached by means of screws 145 to the under side of base 2 of the head of the machine. A way 146 is formed in a bearing projecting from the under side of said base, and in this way, the bracket 144 is located as is shown in Fig. 38. The bracket has a downwardly extending part 147 formed on it, and in a bore passing through this part is located a short vertical shaft 148. To the upper end of said vertical shaft is attached by means of a screw 149, the base 150 of a looper 151. The looper is provided with a downwardly extending flange 152 from which projects a laterally projecting flange 153. Intermediate the wall of the flange 152 and the outer wall of the hook 151, is a channel 154. The looper 151 is provided with a beak 155, and the channel 152, extends to the point of said beak. A bobbin case 156 is provided with a flange 157, which latter is located on the flange 153. These flanges serve as a means of a bearing between the bobbin case and the hook. On the bottom of the case is a reduced portion 158 which extends just below the flange 153 of the hook. To the bottom of the case is attached an auxiliary hook 159 which is formed integral with a disk 160. The disk is suitably attached to the lower side of the bobbin case by means of screws 161. The disk 160 is of such size that it extends to the channel 154 of the hook. It is thus seen that the disk contacts with the lower edge of the flange 152 and the lower side of the flange 153 and thereby retains the bobbin case in its seat. The bobbin case is provided with a locating pin or projection 162 and the auxiliary hook disk is provided with a hole 163 in which the said pin fits, and serves as a means for properly locating the auxiliary hook on the bobbin case. The bobbin case is provided with a spindle 164 which is adapted to carry a bobbin 165, and a stop finger 166 is adapted to engage a notch 167 formed in the under side of the needle plate 168. The engagement between the finger 166 and the notch 167 prevents the bobbin case from turning with the hook, and the auxiliary hook being attached to the bobbin case; it also is held from turning with the hook. The notch or way 167 in the plate 168 is of sufficient width to permit a loop of needle thread to pass freely around the stop finger and up through a needle slot 169 which is formed in the plate 168. On the upper side of the needle plate 168 is located a boss 169* through which the needle slot 169 extends. In the bobbin case, under the finger 166 is a hole 170 through which the bobbin thread passes to the work. The base 150 which carries the hook is provided with a vertical flange 171 and a lateral or horizontal flange 172; a downwardly extending wall 173 of the hook 151 is of such diameter that it fits over the flange 171 and rests on the flange 172. The hook is secured to the flange 172 by means of screws 174. The auxiliary hook 159 extends upwardly in a vertical plane, and is slightly inclined in an opposite direction to that in which the hook 156 revolves. This hook is of such height that it extends substantially to the top of the groove 154, and enters said groove just at the point of the beak 155 of the hook 151.

The following means are provided for revolving the hook mechanism that has just been described. It is noted that by suitable means the looper shaft 4 of the machine is revolved in unison with driving shaft 3. On the looper shaft is secured a gear 175 which meshes with a gear 176; the latter being one half the diameter of the former. The gear wheel 176 is suitably secured to a short horizontal shaft 177 which latter is suitably journaled in depending bearings 178. On the shaft 177 is secured a bevel gear 179 which meshes with a bevel gear 180; the latter being secured to the lower end of the short vertical shaft 148. The gears 179 and 180 are of equal diameter. The gear 175 being twice the diameter of the gear 176, it is to be understood that the latter revolves twice to each revolution of the former, and through the connection between the gear 176 and the looper 151 the latter is revolved twice to each revolution of the shaft 4. As the shaft 4 revolves in unison with the driving shaft 3 of the machine, and as the needle-bar is reciprocated by the said driving shaft, it is of course understood that the looper revolves twice to each reciprocation of the needle.

In my application Serial No. 93,037, filed February 7, 1902, is disclosed a looper mechanism in which the looper revolves a plurality of times to each reciprocation of the laterally moving needle, but in the said application, no work moving mechanism is disclosed. In my present application, a work moving mechanism adapted to coöperate with the plurality revolving looper, and the laterally moving needle, and to move the work across the reciprocating path of said needle, is disclosed. This work moving mechanism will be described farther on, in this application. The means provided in this machine for automatically controlling the bobbin, and regulating the supply of thread drawn from the same in the depositing of stitches on the fabric, will now be described.

In my Patent No. 875,603, issued December 31, 1907, is disclosed the bobbin controller which is made a part of my present application. In the said patent, this bobbin controller is broadly claimed in a sewing machine, but in the said machine a work moving mechanism adapted to coöperate with said bobbin controller is not disclosed.

In my Patent 875,613, issued December 31, 1907, is disclosed an improved bobbin controller, and a hook mechanism, but in said patent, the ornamental stitch part of my stitch forming mechanism as in my present invention is not disclosed; nor is a work moving mechanism adapted for use as in my present machine shown in the said application. In my present application, I desire to protect my automatic bobbin controller adapted for use in combination with my ornamental stitch forming mechanism, and also in combination with my work moving mechanism disclosed in this application. This bobbin controller was especially designed for use in my ornamental stitch or embroidery machine, in which varying lengths of thread are drawn from the bobbin in making various ornamental stitches and designs. Referring now to the construction of the said automatic bobbin controller 181, represents a peripheral cam which is secured by means of a screw 182 to the shaft 4 of the machine. To the under side of the bracket 144 is secured by means of screws 183, an auxiliary bracket 184, which latter is provided with an upwardly extending boss 185. (See Fig. 41.) In the boss 185 is secured a stud screw 186, on which is pivoted a controller 187. On the said stud screw along side of the controller, is suitably located a spring 188. One end of said spring is at 189 connected with the controller 187, and the other end of the spring is located in an adjustable part 190; the said part having extending ends 191 and 192. A screw 193 passes freely through the extending end 191, and has a seat in the extending end 192. This construction, it is to be understood, serves as a means for adjusting the part 190 around on the stud screw 186 and then clamping the same to the said stud screw. It is of course understood, that as one end of the spring 188 is connected to the bobbin controller, and the other end to the part 190, that the adjustment of this part 190 serves as a means for regulating the tension of the spring on the controller 187, and in turn regulating the pressure of the controller on the bobbin 165. On the under side of the outer end of the controller 187 is formed a small boss 194, which is the contacting part of the controller with the bobbin. On the stud screw 186, and next to the controller, is mounted to turn a lever 195, on the rear end of which is located an anti-friction roller 196, the periphery of which, is convex as shown in Fig. 41. A spring 197, one end of which is attached to an L shaped pin 198, and the other end of which is attached at 199 to the rear end of the lever 195, serves as a means for holding the lever in engagement with the peripheral cam 181. An adjustable screw having a head 200, which is located in the forward end of the lever 195, serves as a means for bringing said lever into adjustable contact with the controller. As it is only necessary to lift the controller from the bobbin a sufficient extent, to permit of the passage of the thread between the bobbin and the controller, it will be understood that a very limited movement of the controller is all that is required.

The peripheral cam 181 is suitably constructed and located to remove the controller from the bobbin as the loop of needle thread passes between the bobbin and the controller, and to bring the controller again into contact with the bobbin at the time the required amount of thread has been drawn from the same. The controller being operated from the movement of the shaft 4, it is to be understood, that it acts in unison with the reciprocating movements of the needle, and that the controller oscillates on its bearing, once to each alternate revolution of the hook. A plate 201 is adapted to cover the bobbin controller mechanism, and the hook as is shown in Fig. 39. The removal of this plate as shown in Fig. 40, gives free access to the bobbin controller and the bobbin, and permits the removal of the bobbin. While the plate 168 is shown displaced in Fig. 40, it is to be understood that it is not necessary to disturb this plate for the purpose of removing the bobbin, as the same may be readily removed when the plate 201 is pushed to one side for this purpose. The take-up in the present form of my invention, consists of a take-up lever 202, which is pivoted in a usual manner at 203, and which is in engagement in a usual manner in a cam groove 204 formed in the take-up cam 20. The said take-up is provided with a thread eye 205. This take-up acts once to each reciprocation of the needle.

The presser foot and means for reciprocating the same, will now be described. A presser foot 206, is provided with a shank 207, in the upper end of which is a recess 208, and through the body of the shank is a slot 209. A presser-bar 210, is slotted at its lower end as at 211, thus forming legs or limbs 212 and 213. The presser-bar 210 is mounted in a usual manner in the forward end of the arm 1 of the machine. A shouldered screw 214, passes freely through a hole formed in the limb 212; the reduced position of the screw is seated in the limb 213 and the enlarged portion abuts against the inner wall of the limb 213, as shown in Fig. 33. The shank of the presser foot is mounted on the enlarged portion of the screw 214, and is located in the said slot 211. The said enlarged portion of the screw passes through the slot 209, which latter permits the presser foot shank to move longitudinally, and to turn laterally on the body of said screw. When the foot is in its operative position, the projections 215 embrace the sides of the presser-bar 210, and thereby prevent lateral movement of the foot. One end of a spring 216, is attached by means of a screw 217 to the presser foot shank, and the other end of said spring is attached by means of a screw 218, to the presser-bar. This spring 216, serves as a means for securely holding the shank of the presser foot in its seat in the presser-bar. The slot 211 is of sufficient width to permit the presser foot shank to turn freely on the body of the screw 214. In swinging the presser foot laterally, a downward pressure is exerted on the presser foot, which disengages the projections 215 from the sides of the presser-bar 210, and thereby permits the foot to be swung laterally to a position as shown in Fig. 32. The outer corners of the projections 215 are beveled as at 219. This serves as a means for permitting the presser foot to be swung back into an operative position without exerting any downward pressure on the foot. As the foot is swung laterally, the inclined portion 219 contacts with the presser-bar 210, and pushes the shank in a direction away from the bar until the recess is directly under the bar, when the spring 216 draws the shank in position in its seat, and the projections 215 into their position of engagement with the bar, in which position the presser foot is securely held as before noted by the spring 216. A stop pin 220, which is located in the presser foot shank so that it abuts against one side of the presser-bar when the foot is in an operative position limits the movement of the presser foot laterally to one direction. The presser foot 206 is provided with a way or channel 221 which is adapted to lead a filling material or cord under the embroidery stitches. To the edge of the presser foot shank is attached by means of a screw 223, a small flat spring 224, which serves as a means for holding the ends of the threads and filling cord at the beginning of the stitching. The channel 221 runs into a needle slot 222, which is formed in presser foot, and which is coincident with the needle slot 169 formed in the needle plate. The object of the construction of this presser foot so it is adapted to be readily swung to one side, is to permit of the free insertion and removal of the work in and from the work carrier of the machine. It also permits of a ready access to the looper for insertion and removal of the bobbin, or for other purposes. The device in connection with a presser foot is desirable for use in any machine where it is advantageous to swing the foot out of the way without detaching it from the presser-bar.

The following means are provided for reciprocating the presser foot so as to disengage the same from the work during the time the latter is being moved: On the shaft 3 of the machine is secured by means of a screw 225 an eccentric 226 which is provided with a stem 227, the upper end of said stem is in engagement with a lever 228 which is pivoted at 229 on a bearing 230. The connection between the stem and the lever is of a ball joint construction as is indicated at 231. The forward end of the lever 228 is in engagement with a projection 232 formed on a part 233 which latter is connected by means of a screw 234 to the presser-bar 210. The presser bar 210 is depressed in a usual manner by means of a spring 235, the lift of the said presser-bar being against the pressure of the spring. In the operation of the machine, the lever 228 is oscillated from the movement of the eccentric 226, and this oscillation of the lever causes it to contact with projection 232 and thereby lift the presser foot from the work. The eccentric is so timed that the foot is lifted from the work just previous to the movement of the same, and remains disengaged from the work until the latter is at rest when the foot again comes in contact with the work. A usual thread guide 236 serves as means for leading the thread to a usual tension device 237 the thread passing from the tension device under the usual slack thread spring 238, thence through the eye 205 of the take-up. From the eye 205 of the take-up, the thread runs through a guide 239, and from thence to the guideway 42 in the needle-holder, and from there to the eye of the needle. Any suitable guideway may of course be used for conducting the thread to the eye of the needle, or for conducting the filling cord to the channel 206 in the presser foot. The head of the machine is secured to a table 240 by means of screws 241 which latter pass through a flange 242 formed on the base 2 of the head. An opening 243 is formed through the table 240 and extends the full length of the base 2 of the machine. Downwardly projecting flanges 244 and 245 which are a part of the base 2 of the head of the machine, extend into said opening and locate the position of the head on the table 240. This table 240 which is constructed separately from the head of the machine is composed of cast iron or other suitable metal and serves as a means on which to mount the work moving mechanism of the machine. In practice it is planed level on the top, and the under side of the flanges 242 are planed, so that when the head is mounted on the table, the table becomes in reality a part of the machine, and forms a bearing suitable for the location of work moving mechanism.

I will now describe the work moving mechanism. To the table 240 is secured by means of screws 246, tracks 247, which have upwardly extending portions 248. In the said upwardly extending portion or flanges 248 is formed a V shaped groove 249. Wheels or rollers 250 are secured to upwardly extending ears 251 which latter are suitably secured to a carriage 252. The rollers 250 extend beyond the edge of the carriage and are located in the V shaped way 249. It is thus seen that the carriage is free to reciprocate, and that the tracks serve as a means for a bearing and guiding the carriage in its reciprocations. It is to be noted that the carriage is elevated a sufficient extent above the table 240 to pass freely over the base 2 of the head of the machine. In the said carriage is formed a circular opening 253, and around the same is a raised bearing 254 in which is formed a V shaped groove 255 (see Fig. 71). Around the edge of said opening 253 and in the under side of the carriage is a recess 256, which recess extends completely around the opening 253, a recess 257 is also formed on the under side of the carriage (as shown in Fig. 50) and this recess runs through into the recess 256. A work carrier rack 258 is located in the opening 253 and on said work carrier rack is formed an upwardly extending section or flange 259. To the top of the section 259 is secured parts 260, which have inverted V shaped portions 261 which are adapted to slide in the way 255, as shown in Fig. 54. On the outer portion of the work carrier rack is formed a toothed flange 262 which extends laterally in the recess 256 of the carriage. It is thus seen that this recess serves as a housing for the teeth of the rack, and that the parts 260 which are located in the circular way 255 serve as a means for locating the rack in the opening 253 of the carriage, and guiding the rack in its circular movement. On the inner wall of the rack and to the lower side thereof is formed a flange 263.

The work carrier clamp will now be described. A recess 264 is formed in the outer ring 265 of the work carrier clamp. In the said groove or recess 264 is located a band of rubber or other yielding material 266, which extends inwardly just beyond the inner wall of the ring 265. A clamping ring 267 is located in the ring 265 and is adapted to clamp the work 268 into engagement with the rubber 266, and thus firmly hold the work in an extended position. In the upper edge of the ring 265 is formed a series of notches 269. To the edge of the part 259 of the work carrier rack is secured by means of screws 270 a latch spring 271 which has a part 272 which is adapted to engage the notches 269. The latch is provided with an extending part 273 which serves as a handle by means of which the latch is moved out of engagement with the notch 269. A downward pressure on the arm 273 twists the spring 271 and disengages the latch from the notches. This connection serves as a ready means for disconnecting the work clamp from the carrier, so that the former may be circularly adjusted relative to the carrier, and the notches serve as a means for determining the extent of such adjustment. These notches are of an equal distance apart around the entire circumference of the clamp. A pin 274 projects upwardly from the notched clamping ring and serves as a means by which the operator may readily move the said ring circularly. In practice, I have found that the inner clamping ring 267 remained in its position during the operation of the machine by reason of the contact between the same and the work which it clamps, so that by friction alone, the work under ordinary circumstances may be held sufficiently taut for all practical purposes. In doing certain kinds of work however, it may be desirable to retain the inner clamping ring 267 in position by positive means.
For this purpose, a series of buttons 275 may be mounted on the upper surface of the part 260 as shown in Fig. 54. The nose of the button next to the ring is inclined so that it wedges on the top of the ring.
The means provided for rotating the work carrier will now be described. In a suitable bore which passes through the work carrier carriage is located a bushing 277 which has a flange 278 formed thereon, and by means of which the sleeve or bushing 277 is secured to the carriage. The sleeve 277 extends through the carrier to the under side thereof. In the sleeve 277 is located a short shaft 279 which has a reduced portion 280 that extends below the carriage as shown in Fig. 54. On the reduced portion of the said short shaft is secured by means of screws 281, a gear wheel 282. The upper side of this gear wheel contacts with the under side of the work carrier carriage, and thereby retains the shaft 279 from the upward movement. On the upper end of the shaft 279 is formed a flange 283, to which is secured a ratchet wheel 284, the under side of the said ratchet wheel contacts with the upper edge of the flange 277, and thus the shaft 279 is retained longitudinally in position. In the upper end of the shaft 279 is located a shouldered screw 284 on the shoulder of which is pivoted a lever 285. The said lever 285 has formed thereon a handle 286, which serves as means for manually operating the lever. On the under side of said lever 285 is suitably pivoted a stop pawl 287 which is held in engagement with the teeth of the ratchet wheel by means of a spring 288. In a bearing 289 which is suitably attached to the carriage by means of screws 290 is located a stop screw 291. A nut 292 is provided for locking said screw into position. In an upwardly extending lug 293 is located an adjusting screw 294. A lock nut 295 is provided for locking said screw into position. To a pin 296 located on the lever 285 is attached one end of a spring 297, the other end of said spring is secured at 298 to a pin which is located in the bearing 289. The normal tendency of the spring 297 is to hold the lever 285 into contact with the end of the stop screw 291. The object of this device in connection with the stop pawl is to provide ready means for manually rotating the ratchet wheel and through it the work carrier which is operated from the movement of the ratchet wheel. The object of the adjustable stop screw 291 is for the purpose of a convenient adjustment for the location of the stop pawl relative to the teeth of the ratchet wheel. The stop pawl should drop into a tooth of the ratchet wheel just as the actuating pawl for the ratchet wheel finishes its forward stroke, and this adjustable stop serves as a ready means for adjusting the stop pawl relative to an individual tooth of the ratchet wheel. The adjustable screw 294 serves as a means for predetermining the number of teeth the ratchet wheel will be moved forward at each stroke of the stop pawl lever 285 to the end that the work carrier may be manually moved a measured distance. A shouldered screw 299 having a reduced portion 300, which latter is threaded and seated in the work carrier carriage and locked therein by means of a lock nut 301 (see Fig. 54). The shouldered screw 299 has a head 302 formed thereon, and intermediate this head and the work carrier carriage is located an idle gear 303 which is adapted to turn on the stud screw 299 (see Fig. 54). The idle gear 303 meshes with the gear 282, and the teeth of the work carrier rack, and it is thus seen that the rotation of the ratchet wheel 284 will cause the work carrier to rotate.

On the bushing 277 and intermediate the flange 278 of the same, and the ratchet wheel is pivoted a pawl lever 304 which carries a pawl 305 that is suitably held in engagement with the ratchet wheel. On the outer end of said pawl lever is located a ball 306. To the ball 306 is pivoted one end of a connection 307, and the other end of said connection is adjustably located in a way 308, which latter is formed in a lever 309. The lever 309 is attached to one end of a shaft 310 which latter is mounted to turn in bearings 311, the bearings in turn being secured to the work carrier carriage by means of screws 312. To the other end of the shaft 310 is attached a lever 313. On the end of the lever 309 which extends above the pivot of the same is a bearing 314, and on the end of the lever 313 which also extends above the pivot of the same, is a like bearing 315. In the bearing 314 is secured one end of a shaft or rod 316, the other end of the said rod being secured in the bearing 315. The rod 316 is located parallel with the shaft 310. To the table 240 is secured a part 317 which has an upwardly extending lug 318, in the upper end of which is secured by means of a screw 319 a bushing 320 on which is formed a flange 321. A bore 322 passes through the bushing or sleeve 320 and this bore is of sufficient size to provide a clearance for the shaft 310 to pass through the same without contacting with the sleeve. On the sleeve intermediate the flange 321 and the part 318 is pivoted a lever 323, the upper end of which is provided with legs 324, which carry antifriction rollers 325. The shaft or rod 316 passes between the said rollers. The periphery of the rollers are concave to conform to the periphery of the shaft 316. The lug 318 and the sleeve 320 in the same are so located that the axis of the lever 323 is concentric with the axis of the shaft 310. The part 317 has a slot 326 formed in it through which passes a screw 327. This screw has a seat in the table 240 of the machine, and serves as a means for rigidly securing the part 317 to the table, and the slot 326 serves as a means for permitting the adjustment of the part 317 longitudinally of the shafts 310 and 316. The side of the part 317 contacts with the side of the rail 247 which is next to it, and this rail serves as a means for guiding the part in its adjustment, and preventing the same from getting out of alinement with the shaft 310. The way 308 runs to a sufficient extent over the axis of the pivot 309 to permit of the adjustment of the link 307, directly over the axis of the said lever, and under such adjustment the connection 307 is at rest. It will now be understood that if the lever 323 is oscillated the shaft 310 will be oscillated, and through the oscillation of said shaft the lever 309 will be oscillated, and that this movement may be transmitted by the connection 307 to the pawl lever 304 and thus the ratchet wheel 284 may be rotated and through it the work carrier revolved step by step.

The means for actuating the primary device that reciprocates the work carrier carriage will now be described, after which the means for oscillating the lever 323, will be described. In the work carrier carriage 252 is located a stud shaft or screw 328, on which is formed reduced portions 329 and 330, the part 330 being threaded. This stud screw is held firmly in position by means of a nut 331, as shown in Fig. 52. On the upper end of said stud screw is formed a large head 332. Intermediate of said head is located a hub 333 of a ratchet wheel 334, the hub being of such length that the top of the ratchet wheel contact with the head 332 of the screw and the end of the hub contacts with the work carrier carriage, and thus the ratchet wheel is retained in an operative position on the enlarged portion or the bearing of the screw 328. Next to the work carrier carriage, on the hub of the ratchet wheel is pivoted a stop pawl lever 335, which carries a stop pawl 336, the latter being adapted to engage the teeth of the ratchet wheel. The stop pawl lever 335 is provided with a handle 337 which serves as a means for manually operating the stop pawl lever. One end of a spring 338 is attached at 339 to the carriage and the other end of said spring is attached at 340 to the stop pawl lever 335. This spring normally draws the handle 337 into contact with an adjustable abutting screw 341, the latter being located in a lug 342, and is rigidly locked therein by a lock nut 343. The lug 342 is formed on a part 344 which is suitably secured to the carriage. A second lug is formed on the part 344, and said second lug is indicated by the reference character 345. In this second lug, is adjustably located a screw 346 which is secured in position by a lock nut 347. This construction in connection with the stop pawl lever is substantially the same as the construction described in connection with the stop pawl lever 296. The object of the stop screw 341 is for the purpose of adjustably locating stop pawl 336 relative to the ratchet wheel 334. The object of the adjustable screw 346 is to predetermine the extent that the lever 335 may be moved, so that the ratchet wheel 334 may be turned a predetermined extent at each movement of the stop pawl lever 335, and this means is provided to the end that the mechanism operated through the movement of the ratchet wheel may be moved forward, a measured extent. On the hub of the ratchet wheel 334 and intermediate the stop pawl lever 335, is pivoted a pawl lever 348, which carries a pawl 349. To the outer end of the pawl lever 348 is suitably connected one end of a pitman 350, and the other end of said pitman is adjustably connected in a way 351 formed in the lower arm of the lever 313. The way 351 extends over the axis of the pivot of the lever 313 so that the connection 350 may be located directly over said axis, and under such adjustment it is to be understood that the movement of the lever 313 will not be transmitted to the pitman 350.

To the work carrier carriage is secured by means of screws 352, abutments 353, slots 354 being formed in the abutments to permit of the lateral adjustments of the same. A bridge 355 is attached to the said abutments by means of screws 356, and this bridge extends across the ratchet wheel 334. In a bore formed in the bridge, is located a bearing 357 to the lower side of which is attached an arm 358, in which is formed a slot 359. To the upper side of the bearing 357 is attached a disk 360, in the upper side of which is formed ways 361, 361ª, 361ᵇ, 361ᶜ. In the periphery of the disk 360 is formed a way 362, in which is located a friction strap 363, the ends of which terminate in extensions 364 and 365, as is shown in Fig. 51. A screw 366 passes freely through the end 365 of the friction strap, and has a seat in the end 364 of the same. This screw serves as a means for regulating the tension between the friction strap and the disk, and a lock nut 367, serves as a means for preventing undesirable movement of the screw 366. One end of a spring 368 is attached at 369 to the bridge 355, and the other end of said spring is connected to the end 365 of the friction strap, and this spring normally holds said end against a stop pin 370 which is located on the bridge. A limiting pin 371 is located on the bridge 355, and this pin serves as a means for limiting the extent that the disk may carry the friction strap forward. The ratchet wheel 334 carries a shouldered screw 372 on which is located a shoe 373, and this shoe is in engagement with the lever 358 by means of the slot 359, so that when the ratchet wheel is revolved the arm 358 is revolved, and through it the disk 360. In the ways 361 is located stop shoes 374 which are adjustably secured in position by screws 375. The upper side of the disk 360 is graduated, and an indicator 376 is mounted adjacent to the said disk on the bridge 355, as shown in Fig. 51. The ways in the disk are also graduated along their edges as is shown in said figure. The object of these graduations will be brought out in the general description of the workings of the machine. On the looper shaft 4 is secured a bevel gear 377 which meshes with a bevel gear 378, the latter being secured to the end of a short shaft (not shown) which is located in a bearing 379, the latter in turn is secured to the under side of the base of the arm of the machine. To the free end of said short shaft is secured an arm 380 in which is formed a way 381. The lower end of a link 382 is adjustably located in a suitable manner (not shown) in the way 381, the upper end of said link 382 is connected to the end of an arm 383, which latter is connected to the end of a shaft 384, the latter being mounted in upwardly extending bearings 385, which are secured to the table of the machine. This shaft 384 is parallel with the shafts 310. An arm 386 is suitably attached to the shaft 384 and to the lower end of said arm is pivoted one end of a link 387. The other end of said link 387 is connected at 388 to the lower end of the lever 323. A way 389 is formed in the shaft 384, and the end of a screw 390 extends through the bearing of the arm 386, and abuts in the way 389 Fig. 53. This serves as means for adjusting the arm 386 along the shaft 384 without disturbing its circular location on the shaft. In adjusting the part 317 laterally, the part 386 is adjusted laterally in unison with the said part 317.

The secondary means for reciprocating, the reciprocating and rotating work carrier, will now be described. On the table 240 is suitably secured by means of screws 391 a bracket 392 in which is formed bearings 393 and 394. A shaft 395 is suitably journaled in the bearing 393, and to one end of said shaft is rigidly secured a gear wheel 396. Next to the gear wheel 396 is a small gear wheel 397 which is secured to the side of a ratchet wheel 398. The ratchet wheel 398 and gear 397 turn freely on the shaft 395. The shaft 395 is retained in its position by a collar 399 attached to its outer end, and the gear wheel 396 which is secured to the other end of said shaft. Next to the ratchet wheel 398, and on the hub of the same (not shown) is pivoted a pawl lever 400 which carries a pawl 401 adapted to engage the teeth of the ratchet wheel 398. A pitman 402 is at one end connected to the pawl lever 400, and at its other, it is adjustably connected by means of a thumb nut 404 in a way 405 formed in the face of an arm 406, which latter is suitably secured to the shaft 384. The way 405 extends over the axis of the shaft 384 so that the pitman 402 may be thrown out of action by adjusting the end of the same over the axis of the shaft 384. A friction controller device, which I generally indicate by reference character 407 is attached to the side of the ratchet wheel 398, and the construction and operation of this friction device is substantially the same as the one described in connection with the needle actuating ratchet 89. In the bearing 394 is suitably journaled a shaft 408, to one end of which is rigidly connected a gear 409 which carries a smaller gear 410. The gear 409 is in engagement with the gear 397, and the gear 410 is in engagement with the gear 396. On the table of the machine is secured a bracket 411, which carries a part 412, and in the part 412 is located to turn a bearing 413, to which is attached a disk 414. To the rear side of the part 413 is secured by means of screws 415, a part 416 which has an outwardly extending arm 417 formed on it. In the said arm 417 is formed a slot 418 in which is located a shoe 419 that is carried by the gear wheel 396. The part 411 is adapted to be adjusted on the table by means of slots 420 through which passes screws 421, which secures the bracket to the table. The slot 418 formed in the arm 417 permits of the adjustment of the disk 414 relative to the gear wheel 396, and in the same plane in which the gear wheel revolves. The face of the disk 414 is provided with ways 422, 423, 424, and 425 which meet and intersect at the center of the disk. These ways are substantially the same as the ways formed in the disk 360. The periphery of the disk 414 is graduated as is shown in Fig. 65. An indicating notch 426 is in the part 412, and serves as a means, in combination with the graduating marks upon the periphery of the disk 414 for predetermining the angular position of the predetermined part of the disk. A stop pawl lever 427 is suitably pivoted on the hub (not shown) of the ratchet wheel 398. This lever carries a stop pawl 428 which is suitably mounted to engage the teeth of the ratchet wheel 398. An adjustable screw 429 is located in a bearing 430, extending from the bracket 392. A screw 431 is located in a bearing 432 which also extends upwardly from said bracket. The stop pawl lever 427 is provided with a handle 433 which serves as a means for manually operating the stop pawl lever 427. One end of a spring 434 is attached to the stop pawl lever, and the other end to the bracket 392 at 435. This adaptation of the stop pawl lever 427 and the parts in connection with it, is substantially the same as the adaptation of the parts in connection with the stop pawl levers 285 and 335, and is for the same purpose, namely, to move manually the operating mechanism a measured extent.

The intermediate means through which the power is transmitted from the secondary work carrier ratchet mechanism to the first, will now be described. In guide ways 436 and 437, is located ends 438 and 439 of a part 440. Intermediate of said ends is formed a cross head 441 in which is formed a way 442. In the way 422 of the disk 414 is suitably secured a shoe 443, which is adapted to operate in the way 442 of the cross head. This shoe 443 may be secured in any of the ways that are shown in the disk 414, and the manner in which it is secured in said way is shown in Fig. 70. The end 439 of the part 440 is toothed as shown in Fig. 7. The said tooth portion meshes with an adjustable toothed disk 444 that is located on the upper side of a toothed disk 445. In the toothed disk 444 is formed slots 446, through which passes screws 447 that have a seat in the disk 445. The screws 447 serve as a means for securing the disk 444 to the disk 445. The disks 444 and 445 are suitably pivoted to turn on a bearing 448, which latter has a seat in the table 240 of the machine. Between guide ways 449 is located a slide 450 which is toothed on one of its edges as at 451, and said toothed portion is in engagement with the toothed disk 445. The guide ways 449 are secured in a suitable manner to the table of the machine. A piece 452 is secured to the top of the guide ways 449, and this piece crosses the top of the slide 450. In the part 452 is located a thumb screw 453, which is adapted to abut the top of the slide 450 for purposes which will be explained in connection with the general explanation of the workings of the machine. To the under side of the toothed disk 445 is secured a disk (not shown), on which is formed an arm 454. The disk on which the arm 454 is formed, rests on the table of the machine, and is of sufficient thickness to bring the tooth disk 445 just above the guide piece 449, so that the said toothed disk 445, is free to engage the toothed portion of the slide portion 450. On suitable abutments located on the top of the slide 450 is a bridge 455, in which is formed a slot 456. In the slot 456 is adjustably secured one end of a pitman 457, the other end of said pitman is connected in a way 361ª formed in the top of the disk 360. On the end of the arm 454 is formed an indicator point 458, and in the table of the machine is located a graduated segment 459. This indicator and graduated segment is for the purpose of predetermining the working position of the work carrier relative to the needle, and also for the purpose of adjusting the working position of the work carrier, a measured distance. This arm and graduated segment also serves as a means for determining the extent of the reciprocating movement of the work carrier carriage from the secondary mechanism which reciprocates it. In the slot 456 of the bridge 455 is located a shoe (not shown) which is adjustably clamped in the slot by means of a screw 459, and a like shoe not shown is adjustably secured in the slot 456 by a screw 460. The end of the pitman 457 is secured in the slot or way 456 intermediate these screws 459 and 460. A handle 461 is a part of a clamping device by means of which the end of the pitman 457 is readily adjusted in the slot 456 and secured therein. The stop screws 459 and 460 are for the purpose of predetermining the location of the end of the pitman 457 in the slot 456, and to permit of the ready adjustment of the said pitman in the way 456 from a position in contact with one of said stops to a position in contact with the other of said stops.

The stop motion device which is provided for this machine, will now be described. In United States Patent, No. 670,163, issued to me, March 19, 1901, I disclose a stop motion which is, broadly speaking, substantially like the stop motion device disclosed in my present application, but in the said patent, said stop motion is not shown or described adapted for use in combination with an automatic embroidery machine. In my present invention, I have arranged this stop motion and the automatic embroidery machine mechanism for use in combination, so that the stop motion may be tripped into action, at any point during the embroidering of a design. In the different designs stitched, there is a very great difference in the number of stitches of which they are composed, and each design is composed, of a predetermined number of stitches. In my present invention, this stop motion is adapted to stop the machine after the completion of any predetermined number of stitches of which the design may be composed. In the finishing of a design, it is desirable to lap the beginning and finishing of the stitching of the design so that a few of the finishing stitches will be deposited on the top of the stitches at the beginning of the design. In my present invention, I have adapted this stop motion, so that it may be set so as to permit the machine to make a few overlapping stitches at the finishing of a design, and thereby secure the ends of the threads at the beginning and ending of a design or pattern.

Referring now to the construction of the stop motion mechanism, 462 is a bracket which is secured to the base 2 of the head of the machine, and back of the vertical section of the arm 1 of the same. The said bracket is provided with upwardly extending lugs 463 and 464, and in the said lugs is journaled a shaft 465. On the shaft 465 is formed a flange 466 to which is secured a ratchet wheel 467. Next to the ratchet 467, is mounted to turn on the shaft 465, a second ratchet 468, to which is secured an eccentric 469 that is intermediate the ratchet wheels. The ratchet 468 is provided with a hub 470 on which is pivoted a pawl lever 471 that carries a pawl 472, which is suitably held in engagement with the teeth of the ratchet wheel 468 by means of a spring 473. To the outer end of the pawl lever 471 is secured one end of a link 474, and the other end of said link is adjustably connected in a way 475 formed in an arm 476 which is secured to the rear end of the shaft 4. The way 475 extends over the axis of the shaft 4 so that the end of the pitman 474 may be adjusted directly over the axis of said shaft. A lever 477 is pivoted at 478 to a bearing 479 extending horizontally from the bracket 462. The lever 477 is enlarged intermediate of its ends as shown in Fig. 10, and in said enlarged portion is formed an opening 480, the lateral walls of which engage the eccentric 469. The teeth on the ratchet wheel 468 and 467 slant in opposite directions. To the bearing 479 is suitably pivoted a stop pawl 481 which engages the teeth of the ratchet wheel 468, and on the said bearing 479 is suitably pivoted a second stop pawl which engages the teeth of the ratchet wheel 467. To the rear end of the driving shaft 3 of the machine, is secured a wheel 483, and next to the wheel 483 is loosely journaled on said shaft 3, a wheel 484. The wheel 484 carries on its side next to the wheel 483, a suitable friction material (not shown). The wheel 484 is provided with an extended hub 485, in the end of which is located a small button shaped bearing 486. The wheel 484 is adapted to move longitudinally of the shaft 3 in and out of engagement with the wheel 483. A clutch lever 487 which is suitably pivoted on a stud shaft 488 and has an upwardly extending arm provided with a head 489 which serves to retain the wheel 483 on the end of the shaft 3 of the machine. The said head is provided with surfaces 490 and 491 and intermediate of the said surfaces is an incline 492. To a hub 493 of the lever 487 is attached one end of a strap 494. The other end of said strap is connected by means of springs 495 to a bracket 496, the latter is secured to the vertical portion of the arm 1 of the head of the machine. To the lower end of the lever 487 is pivoted one end of a catch 497 which is adapted to be engaged by a latch 498. A notch 499 is provided in the catch, by means of which the latch engages the catch. In a bracket 500, is located a threaded bolt 501 which carries clamping nuts 502 and 503. To one end of the bolt 501 is attached at 504 one end of a spring 505, the other end of said spring being suitably connected to the lower end of the lever 487. The outer end of the stud shaft 488 is threaded and on said threaded end is located nuts 506 which serve as a means for locating the lever 487 and retaining the same in position on the stud shaft 488. The ratchet wheel 467 carries a small pivoted lever 507 which is adapted to engage the latch 498 and lift the same out of the notch 499. The latch 498 is pivoted at 508 to the bearing 463 of the bracket 462 and intermediate the ends of the latch 498 is a spring portion which permits the free end of the latch to be lifted against the action of said spring portion. When the stop motion is in its normal position, the latch 498 is located in notch 499, and the lever 487 is in the position shown in Fig. 9, and when in this position the bearing 486 is located on the head 489 of the said lever, as indicated by dotted lines shown in Fig. 4. When the lever 487 is in this normal position, it is held so by the latch and catch against the action of the spring 505. The bolt 501 and the nuts 502 and 503 serves as a means for adjusting or regulating the tension of the spring 505. In the pawl lever 477, is formed a notch 509, and in the pawl 472 is located a spring catch 510, the end 511 of which is adapted to engage the notch 509 and thereby hold the pawl out of engagement with the ratchet wheel. To the arm of the machine is attached a bracket 512 which carries a bolt 513 which is adjustably secured in the bracket by means of nuts 514. Intermediate the bolt 513 and the clutch strap 494 is a spring 515. The purpose of this connection is to assist in yieldingly holding the strap 494 from sagging and coming in contact with the periphery of the wheel 483 when the stop motion is out of action. When the stop motion is in its normal position, the clutch strap 494 is out of engagement with the periphery of the wheel 483. The inner end of the lever 507 is attached to a spring 516 which latter is secured to the ratchet 467 by means of a screw 517. A slot 518 formed in the ratchet wheel 467 serves as a housing for the spring 516. A pin 519 is located in the end of the lever 507, and extends from the said lever into the slot 518. Normally the spring 516 draws on the lever 507 so that the pin 519 contacts with the side of the slot 518, as shown in Fig. 13.

In the operation of the machine, the stop motion mechanism begins to act, when the free end of the lever 507 comes into engagement with the latch 498. As this engagement takes place, the lever 507 turns on its pivot against the action of the spring 516 until the pin 519 contacts with the end of the slot 518, at which point the lever 507 commences to raise the end of the latch 498, and continues to raise it, until it is disengaged from the notch 499. This disengagement of the notch and the latch permits the spring 505 to act, and this spring rapidly turns the lever 487, until the clutch strap 494 contacts with the periphery of the wheel 483. Under this movement of the lever, its head is swung laterally until the reduced portion of the head is opposite the bearing 486, as indicated in Fig. 4. Just after the movement of the lever 487 permits the disengagement between the wheels 483 and 484, the clutch strap 494 comes into engagement with the periphery of the wheel 484 and stop the machine. The wheels 483 and 484 and consequently the driving shaft of the machine turn in the direction indicated by the arrow in Fig. 9. It will thus be seen that as soon as the contact between the clutch strap 494 and the periphery of the wheel 483 takes place, the tendency of the further movement of the wheel 483 is to turn the strap in a direction that increases the force of its clutch on the wheel. The rear end of the clutch strap 494 being attached to springs 495, it is of course understood that the machine is yieldingly stopped when the clutch goes into action. In my Patent 875,609, issued December 31, 1907, I disclose means for tripping this stop motion into action from the movement of the thread. The object of this device as stated in the said patent is for the purpose of stopping the machine in the event of a thick place or a knot being in the thread, and thus avoiding the breaking of the thread and at times the needle, by allowing the knot or thick place to reach the needle when the machine is in operation. While this device is especially adapted for use in my automatic embroidery machine, it is also useful in various other kinds of machines. In my automatic embroidery machine, it is especially desirable not to have the thread break during the stitching of a design, and it is especially desirable in any machine not to have the needle break. In my said patent, this device is broadly claimed. In my present application, I desire to protect it as adapted for use in my automatic embroidery machine.

Referring now to the device for tripping the stop motion into action from the movement of the thread, 520 indicates a lever that is pivoted at 521 to the vertical portion of the arm of the head of the machine. The lower end of said lever extends under the latch 498, as indicated in Fig. 15. The upper end of the lever 520 is enlarged as at 522, and just above the enlarged portion, is a housing 523, in which is located stop needles 524, that are held in position by means of a screw 525. In the arm of the machine is located a stop 526 which is adapted to engage the lever 520, and arrest the movement of the same.

527 indicates the thread leading to the needle and 528 a knot in the thread. The part 522 of the pivoted lever 520 is of sufficient weight to cause the lower end of the lever 520 to lift the catch 498 when the lever is moved, so it falls into engagement with the pin 526, and the pin is located that the catch 498 is drawn out of the notch 499 before the lever 520 reaches the pin. The lever 520 is normally in about the position shown in Fig. 3, and when in this position, it leans against a stop pin 528 to a sufficient extent to one side of a vertical line to cause it to remain in this position, against the friction of the thread as it passes through the eye of the needle that is carried by the end 523 of the drop lever. In the operation of this device, a needle is inserted in the upper end of the lever 520, having an eye of sufficient size to permit the thread which is being used to normally pass freely through the same. The needle which is used for stitching purpose has an eye in it of such size that the thread that passes through the stop needle will also pass freely through it. In thread, there are always knots, thick places, lumps, snags, etc. When one of these thick places or knots is in the thread in my machine, it will not pass through the eye of the stop needle 524, but when it reaches the said stop needle, it will carry the top of the lever 520 in a direction to the forward end of the machine, until the same is slightly past a vertical line, running through the pivot of the lever, and when this point is reached, the weighed portion 522 of the lever causes it to fall rapidly into the position shown in dotted lines in Fig. 3, and thus the stop motion is tripped into action by the movement of the thread.

A general explanation of the operation of the machine will now be made. Assuming that it is desired to stitch two pieces of fabric together by plain stitching, and that the path of said plain stitching is desired in a circle or a part of a circle, the mechanisms are adjusted for this purpose, as follows: The end of the link 115 is adjusted to a position directly over the axis of the arm 113, and this arrests all movement of the needle operating ratchet mechanism. The part 72 of the two part lever 61 is disconnected from the lever, and secured to the boss 143, and this arrests the lateral movement of the needle. If it is desired to arrest the lateral movement of the needle without disconnecting the part 72 from the lever 61, the lower end of the part 87 is adjusted over the pivot of said lever 61, and this also arrests all lateral movement of the needle. Under either one of these adjustments, the needle reciprocates in a vertical path as in a plain sewing machine, and it is only necessary to move the work forward step by step to make a plain stitched seam. To adjust the work moving mechanism so as to make a plain stitched seam in a circle, the end of the pitman 350 is adjusted to a position directly over the axis of the pivot of the lever 313, which adjustment arrests the movement of the primary ratchet mechanism for reciprocating the work carrier, and the movement of the secondary ratchet mechanism is arrested in a like manner by adjusting the position of the end of the pitman 402 directly over the axis of the arm 406 which adjustment arrests the movement of the secondary ratchet mechanism. The end of the pitman 307 is now adjusted away from the axis of the lever 309 a sufficient extent to move the work carrier ratchet forward, which in turn revolves the carrier. The distance the end of the pitman 307 is moved from the pivot of the lever 309, determines the extent of the stroke of the actuating pawl 305, and consequently, the extent of the forward movement of the work carrier at each stroke of said actuating pawl, and the extent of said movement of the work carrier at each stroke of the pawl, determines the length of the stitch. It is now understood that if two or more pieces of work are clamped together in the work carrier clamping device, and the same is placed in the work carrier rack, these pieces may be stitched together, and a plain seam thereby formed in a circular path. If it is desired to make a seam which will comprise only part of a complete circle, the stop motion device is adjusted to stop the machine after the desired number of stitches have been made. If now it is desired to make a plurality of lateral stitches, say four in one direction, and then the same number in an opposite direction, the end of the link 115 is adjusted away from the axis of the arm 113 so as to move the pawl 117 forty-five degrees at each stroke, and the end of the link 91 is adjusted out from the axis of the ratchet 89 to reciprocate the end of the part 49 in the way 76 of the part 72. The part 72 is adjusted angularly from the vertical until the desired extent of lateral movement is given the needle. The more the way 76 is oblique to the vertical, the greater will be the extent of lateral movement of the needle, under a given extent of reciprocation of the shoe 77. If now it is desired to stitch a square figure within the diameter of the work carrier, the end of the pitman 402 is adjusted on the arm 406, so that the stroke of the pawl 401 is of such an extent that the disk 414 is revolved four times to each revolution of the work carrier. The shoe 443 is adjusted a sufficient distance from the axis of the disk 414 to reciprocate the work carrier carriage the distance of the altitude of an arc of 90 degrees, inscribed within the diameter of the work carrier. The disk 414 is adjusted laterally so that it is located eccentrically relative to the gear 396, a sufficient extent to produce the relative increase in the speed of the reciprocation of the work carrier required for a square figure. In making this figure the shoe 443 is located in the way 422 which is parallel with the way 418 in the arm 417.

It will now be seen by referring to Figs. 7, 65 and 67, that the relations and position of the parts in these figures are such that the disk 414 is at its maximum of speed, and the work carrier is in such a position that if a square figure were being stitched, the needle would be at a corner of the square, or the stitching being done under these conditions would be at this point. In stitching a square figure, the speed of the lateral movement of the work carrier carriage is increased and decreased to correspond to the increase and decrease in the distance between the arc and the chord from one corner of the square to the other. Assuming for example that the work carrier is in the position shown in Fig. 7, and that the corner 533 of the square shown in light dotted lines is under the needle in the operation of the machine from this point the revolving work carrier will be moved laterally in the direction indicated by the arrow in Fig. 7 until the point of the side of the square indicated by line 531 is reached. During this movement, the speed of the lateral movement of the work carrier will be increased to correspond to the change in distance between the chord of the arc and the altitude of the arc, and of course, from this point to the next corner there will be a corresponding decrease in the speed of the lateral movement of the work carrier. The sides of a square figure may be made concave or convex by increasing or decreasing the extent of the reciprocating movement of the work carrier a sufficient extent for this purpose. By shifting the shoe in different angular positions on the disk 414, it is to be understood that the outline of a square figure is varied or changed entirely. For example, if the shoe 443 is changed from the way 422 to the other side of the axis of the disk 414, or into the way 423, the work carrier will be moving laterally at its minimum speed when it is in the position shown in Fig. 7, and at its maximum speed when at the opposite end of its reciprocating stroke, and this of course, changes the entire shape of the figure. Or if the said shoe is changed into ways 424 or 425, the speed of the reciprocating movement of the work carrier will be at its maximum when the carrier is at the center of its reciprocating stroke, and this again changes the shape of the figure. These figures that are made by revolving the disk 414 four times to each revolution of the work carrier, may be varied or changed in various other ways than those mentioned. For example, the extent of the eccentricity of the disk 414 relative to the gear 396 may be changed and this also changes the shape of the figure. Adjusting the working position of the work carrier laterally so the figure will be made nearer the axis of the carrier, also changes the shape of the figure and in various other ways, it may be changed. If it is desired to shift angularly the work carrier and then reproduce a given figure, this may be done. For example, assume that the square figure indicated in light dotted lines Fig. 7, has been stitched, and it is desired to reproduce this figure, but to shift the location of the reproduction so the stitching will interlace. After stitching the first square figure, the path of which is indicated by 534, adjust the work circularly forty-five degrees, and then stitch the second square figure, the path of which is indicated by heavy dotted lines. During each revolution of the disk 414, the revolving work carrier is reciprocated once, and the shape of the design made from the movement of the mechanism which operates this disk is determined by the speed of the movement of the disk relative to the speed of the rotation of the work carrier. The disk, it will be remembered, revolves four times to make a square figure.

Assuming now that the work carrier operating mechanism is still under the adjustment and that it is desired to make a zig zag seam over the zone of the path stitched in said figure, this may be done by making the following adjustments in the needle operating mechanism. Adjust the end of the part 91 over the axis of the ratchet wheel 89, and disconnect the part 72 from the boss 143, and connect it to the oscillating lever 61. Adjust the end of the part 49 on the part 72 a sufficient distance from the axis of the lever 61 to give the needle the required extent of lateral movement, and the zig zag seam will be stitched. It is of course understood, that the needle moves under this adjustment, the needle moves laterally only a single step, first in one direction and then in the other. If it is now desired to automatically increase and decrease the extent of lateral movement of the needle, this may be accomplished by making the adjustment that has been explained, which brings the ratchet wheel 89 into action. In connection with adjusting the ratchet wheel into action, the end of the part 91, Fig. 46, is adjusted a sufficient distance from the axis of the ratchet to give the required extent of reciprocation to the shoe 77 and through it the required movement of the end of the part 49 on the part 72. As the part 72 oscillates about the axis of the lever 61, it is evident that as the end of the part 49 is moved toward the pivot of the lever 61 the extent of the lateral movement of the needle is decreased and that when it is moved from the axis of said lever it is increased. Assuming now that the work carrier mechanism is still under the adjustment for stitching or embroidering a square design, and that the part 72 oscillates an equal distance each side of the vertical line. It is to be noted that the increase and decrease in the lateral movement of the needle under this adjustment is an equal distance each side of the center of the zone of lateral movement of the needle.

In making various kinds of designs, it is desirable to have the increase and decrease in the lateral movement of the needle altogether from one side of the zone of said lateral movement. How this is accomplished, will now be explained. It will be remembered that the way 76 in the part 72 is concentric with the pivot 46 of the part 48. Assuming now that it is desired to have the increase and decrease in the lateral movement of the needle from a given line, adjust the part 72 so the way 76 is concentric with the pivot 46 of the part 48, when the lever 61 is in the extreme of its movement in the direction of the arrow shown in Fig. 42. It will now be understood that under this adjustment the needle will always move to the same position at the right, and all the change in the extent of the lateral movement of the same will be from this point to the left. The zone of lateral movement of the needle, or the change in the working position of the laterally vibrating needle, is changed by adjusting the part 72 laterally so that the way 76 in said part is always oblique to the vertical in either one of the lateral positions of the same. For example the inverted scallops of which a square design may be composed is produced by adjusting the part 72 so that the way 76 is a sufficient extent to one side of the vertical to produce the same. The depth of the stitches of the embroidered inverted scallops depends upon the extent that the way 76 is to one side of the vertical when the part 72 is in the extreme of its movement in the direction of the arrow shown in Fig. 42. At this point, the end of the part 49 is the farthest from the axis of the lever 61. It will now be understood that under this adjustment, the extent of the lateral movement of the needle is automatically increased and decreased, and that simultaneously with this change, the zone or working position of the needle is changed laterally. At this point, the object of connecting from the end of the part 49 to the part 92 and from this part to the ratchet 89, instead of connecting direct from the part 49 to the ratchet wheel, will be set forth. The axis of the ratchet wheel 89, is directly under the axis of the pivot of the part 91, and therefore when the lower end of said part is adjusted away from the axis of the ratchet in the way 90, said lower end will move an equal distance each side of the axis of the ratchet as the same revolves. This insures that the speed of each stroke of a reciprocating movement transmitted from the ratchet to the part 92 will be the same, and that therefore no matter if the part 72 is adjusted laterally so the lower end of the part 87 is to one side of a vertical line, the speed of each stroke of the reciprocating movement of the end of the part 49 in the way 76 will be the same. This insures that the speed of increase in the lateral movement of the needle will be the same as the decrease, or that the speed of any change in the lateral movement of the needle will be the same. For example, if the part 87 was connected directly with the ratchet wheel in doing the work indicated in Fig. 80, the lower end of said part 87 would be always to one side of a vertical line running through the axis of the ratchet wheel, therefore the downward stroke of the reciprocation of the end of the part 49 in the way 76, would not be the same as the upward stroke of said reciprocation of said part. It will now be understood, that the object of the above method of changing the needle laterally from the movement of a ratchet wheel is for the purpose of having the figure that may be stitched uniform. So that the second half of the figure for example, will be the same as the first half. If it be desired to make an inverted scallop along the side of the square, the connection 457 is adjusted in the way 361ª of the disk 360, and under this adjustment, an inverted scallop will be made along the sides of the square. To stitch or embroider an ellipse or oval, the ratchet wheel 398 is adjusted so that the disk 414 revolves twice to each revolution of the work carrier. The extent of the reciprocating movement of the work carrier from the rotation of the disk 414 is adjusted so that it is equal to the greatest distance between the side of the oval and the diameter of the circle. The shape of this oval, like the other figures, that can be made on this machine, may be indefinitely varied by the mechanism shown and described, and if it is desired to make various kinds of ornamental stitches or designs within the oval, this may be accomplished by changing the relative speed of the various parts which combine to make the movements. The periphery of the oval may be ornamented by fancy stitches, or scallops, by the means which have been described.

The binding stitch, along the periphery of the compound scallop is made by adjusting the part 87 upwardly so as to bring the end of the part 49 near enough to the pivot of the lever 61 to give the needle the required small extent of lateral movement. It will be noticed that the change in the extent of the lateral movement of the needle in this design, is altogether to one side of a given line so to reduce the extent of the lateral movement of the needle, to make the narrow binding stitch it is only necessary to make a single adjustment. For example, to reduce the extent of lateral movement of the needle from the extent required to make the long and then the short stitches, it is only necessary to loosen the thumb screw 98 and move the part 97 up a sufficient extent to properly reduce the extent of lateral movement of the needle. The part 96 is graduated at 548 so that the proper extent of adjustment at this point may be readily made. To interlock the binding stitches along the edge of a design with the stitches previously made, each ratchet wheel that may be in use in making the said design is moved forward an extent that is equal to the extent of the movement of its actuating pawl. In making this row of stitches, the needle is thrust through the material at 550, for example, and then it is moved laterally and thrust through the material at 551, and this is continued until the entire periphery of the design has been stitched; after which, the various ratchet wheels that are used in making the design are moved forward the extent of one stroke of their actuating pawls as before noted. Now when the narrow binding stitches are made along the edge, the needle is thrust through the material at 552 for example, and then at 553, and so on until the edge of the design has been covered. It is thus seen that the binding stitches interlock with the stitches previously made along the edge of a design. In making the first row of stitches around the edge of a design, a filling cord, or material 554 is led under the stitches by the means which have been described, and if it is desired, a filling thread may also be led under the binding stitches. It is of course understood, that the edge of a design is finished in this secure manner for the purpose of making the same durable, it being understood that the linen or fabric is cut away from the edge of the design after it is finished.

In this machine, the speed of the movements of the ratchet wheels 284, 398, 334, and 398, are under adjustment and therefore the speed of the mechanism is actuated by these ratchet wheels may be changed and their speed relative to each other may also be changed. In addition to changing the speed of the movements of the mechanisms, their angular position relative to each other may be changed. While the designs match in one or two rotations of the work carrier, it is to be understood that the mechanisms may be adjusted relative to each other, so that the work carrier will revolve a large number of times before the stitching will match. For example, say in one rotation of the work carrier the disk 414 revolves one and one fifth times, then the work carrier will revolve five times before the stitching will match or before the needle will reach the place where the stitching of the design was commenced. It is now thought that a sufficient number of movements in the machine, and the designs made by said movements have been explained for the workings of the machine to be understood, and that it has been made clear that the machine may be adjusted to make practically an unlimited number of different designs. The number of teeth in the ratchet wheels which act to trip the stop motion into action, are such that the stop motion may be set to stop the machine after a few finishing stitches have been made on top of the beginning stitches of a design. For example, suppose a design is composed of 5,280 stitches and that the ratchet wheel 468 has 134 teeth in its periphery, and the ratchet wheel 467 has 79 teeth in its periphery. To have the stop motion stop the machine after a few finishing stitches have been made on top of the beginning stitches in a design which is composed of this number of stitches, the stroke of the actuating pawl 472 is adjusted so as to move the wheel 468 forward two teeth at each stroke, and under this adjustment, it is evident that 67 stitches will be made during one revolution of the wheel 468. For each revolution of this wheel, the pawl 471 feeds the wheel 467 forward one tooth, therefore the wheel 468 will revolve 79 times in revolving the wheel 467 once, so 5,293 stitches will be made under this adjustment before the machine will be stopped, and as the design is composed of only 5,280 stitches, thirteen stitches will be made on the top of the beginning stitches of the design.

It is to be understood that while I use eccentrics for producing the various lateral movements of the work carrier, and the various changes in the lateral movements of the needle, that I do not wish to be limited, or to have it understood that these eccentrics are essential. Any means may be used for producing these movements such as cams and the like. By making these movements by the use of cams, and then varying the cams relative to each other, and varying the speed as to parts of their movement relative to other parts of their movement, as is done by these eccentrics, the movements from the cams can be indefinitely varied, and figures may be produced by the use of cams that cannot be produced by eccentrics.

The movements of the various mechanisms which move the work, and move the needle so as to call for a supply of thread from the bobbin are so timed relative to the bobbin controller, that the supply of thread needed to complete a short or a long stitch is drawn just previous to the controller coming into engagement with the bobbin, and thereby preventing a further delivery of thread from the same. The movement of the looper relative to the auxiliary hook, which assists the looper in passing the loop of needle thread around the bobbin, and the movements of these parts relative to the take-up and the movement of the needle and the work, are such that no strain is placed on the thread at all, until the point is reached where the stitch is locked in the material. It is to be understood however, that by the mechanism disclosed, an endless variety of different designs may be automatically stitched or embroidered, and that it is not necessary to change cams in order to change the design, but only necessary to make different adjustments by simple means that have been provided for this purpose.

As before noted, it is obvious that cams may be used for special designs or other purposes, and these designs made by the use of cams may also be varied by the means herein disclosed.

Having now described a preferred form of my invention, what I claim as new is:

1. In combination in a sewing machine, a work moving mechanism comprising a carriage, a work holding device adapted to be moved circularly carried by said carriage, mechanism for moving circularly said work holding device carried by said carriage, a second mechanism carried by said carriage which is independent of the movements of the said first mechanism for moving circularly the work holding device, and means adapting said second mechanism to reciprocate said carriage.

2. In a sewing machine, a work moving mechanism comprising a revolving work carrier located on a carriage which is adapted to reciprocate means for revolving said work carrier, means for reciprocating the carriage, a reciprocating part in bearings which are separate from the carriage, a way formed in said part, a pitman, one end of said pitman adjustably connected in said way, the other end of said pitman connected to the means which reciprocates the carriage, and a stitch forming mechanism adapted to coöperate with said work moving mechanism.

3. In a sewing machine, a work moving mechanism comprising an operating work carrier mounted on a carriage, means for reciprocating said carriage comprising a revolving part, a reciprocating part, a way formed in said reciprocating part, a pitman, one end of said pitman adjustably connected to said revolving part and the other end of said pitman adjustably connected in said way, and a stitch forming mechanism adapted to coöperate with said work moving mechanism.

4. In a sewing machine, a work moving mechanism comprising a carriage, a toothed rack the toothed portion of which is covered by a portion of said carriage, means for clamping the work carrier, an operating ratchet wheel mounted on the upper side of said carriage, a gear wheel located on the under side of said carriage which is operated by said ratchet wheel, said gear wheel adapted to operate the toothed rack, and a stitch forming mechanism adapted to coöperate with said work moving mechanism.

5. In a sewing machine, a work moving mechanism comprising a reciprocating carriage, a circular opening in said carriage, a work carrier located in said opening, a circular way or groove formed in said carriage, a plurality of shoes carried by the work carrier adapted to slide in said way, and a stitch forming mechanism adapted to coöperate with said work moving mechanism.

6. In a sewing machine, a work moving mechanism comprising a circular rack, means for rotating said rack, a work clamping device carried by said rack, said work clamping device provided with a series of notches, yielding means carried by the work carrier for engaging said notches, and a stitch forming mechanism for coöperating with said work moving mechanism.

7. In a sewing machine, a work moving mechanism comprising a work carrier, a circular work clamping part for said work carrier, a groove formed in the inner wall of said part, yielding means located in said groove for engaging the work, a second part adapted to clamp the work to said yielding means, and a stitch forming mechanism adapted to coöperate with said work moving mechanism.

8. In a sewing machine, a work moving mechanism comprising a reciprocating part, means for reciprocating said part comprising an oscillating lever, a shaft the axis of which is concentric with the axis of said lever, means adapting the lever to oscillate the shaft and permit the same to move longitudinally relative to the lever, and means whereby the said reciprocating part is reciprocated from the oscillating movement of said shaft.

9. In a sewing machine, a work moving mechanism comprising an operating work carrier mounted on a carriage, means for reciprocating said carriage comprising a rotating wheel, a bridge extending over the top of said rotating wheel, a part adapted to rotate mounted in said bridge, an arm having a way formed in it carried by said part and located under the bridge, a shoe carried by said rotating wheel adapted to operate in said way, a disk carried by said part and located above the bridge, means in connection with the disk whereby the carrier is reciprocated from the movement of the disk, and a stitch forming mechanism for coöperating with said work moving mechanism.

10. In a sewing machine, a work moving mechanism comprising a revolving work carrier mounted on a carriage, means for reciprocating the carriage comprising a rotating disk carried by the carriage, a plurality of ways extending across the face of said disk, a connection between one of said ways and a part of the machine that is separate from the carriage, and a stitch forming mechanism adapted to coöperate with said work moving mechanism.

11. In a sewing mechine, a work moving mechanism comprising an operating work carrier mounted on a carriage, an operating ratchet wheel, a bridge extending over the said ratchet wheel, a device adapted to reciprocate said work carrier mounted on said bridge, a connection between said device and a part of the machine whereby when the device is operated the carriage is reciprocated, means adapting the ratchet wheel to operate the device, means for adjusting the bridge in the direction in which the carriage reciprocates, and a stitch forming mechanism adapted to coöperate with said work moving mechanism.

12. In a sewing machine, a work moving mechanism comprising a work carrier, means for reciprocating said work carrier comprising a pivoted lever that is forked at one end, a roller carried by each prong of the fork of said lever, a shaft the axis of which is concentric with the axis of said lever, an auxiliary bar carried by said shaft, said bar located between said rollers whereby the shaft is oscillated and free to move longitudinally, and means for reciprocating the work carrier operated from the oscillating movement of said shaft.

13. In a sewing machine having a stitch forming mechanism, a work moving mechanism, one of said mechanisms comprising an operating ratchet wheel, a stop pawl for said ratchet wheel, said stop pawl mounted on an eccentric bearing, means for adjusting the angular position of said eccentric and means for locking the eccentric in position.

14. A sewing machine comprising a stitch forming mechanism, a work moving mechanism, one of said mechanisms comprising an operating ratchet wheel, a stop pawl for said ratchet wheel, said stop pawl mounted on an eccentric bearing, means for adjusting said eccentric and locking the same in position, a friction device for said ratchet wheel, and means adapting said friction device to draw the teeth of the ratchet wheel against the stop pawl.

15. A sewing machine comprising a stitch forming mechanism, a work moving mechanism, one of said mechanisms comprising an operating ratchet wheel, a stop pawl for said ratchet wheel, said stop pawl mounted on an eccentric, said eccentric mounted on a bearing and adapted to turn thereon, means for locking the eccentric on the bearing, and a friction device adapted to draw the teeth of the ratchet wheel into engagement with said stop pawl.

In testimony whereof I have hereunto signed my name in the presence of two subscribing witnesses.

WILLIAM N. PARKES.

Witnesses:
  J. B. McGirr,
  Wm. W. Ketchum.